US012552621B2

(12) United States Patent
Kleinikkink et al.

(10) Patent No.: US 12,552,621 B2
(45) Date of Patent: Feb. 17, 2026

(54) SYSTEM AND METHOD FOR ACTUATION IN A LINEAR MOTOR CONVEYOR SYSTEM

(71) Applicant: ATS Corporation, Cambridge (CA)

(72) Inventors: Albert John Kleinikkink, Cambridge (CA); John Ditner, Cambridge (CA); Bradley James Woodward, Cambridge (CA); Blake Robert Lambert, Cambridge (CA); Seyyedmohamadhasan Karparvarfard, Cambridge (CA); Roger Hogan, Cambridge (CA)

( * ) Notice: Subject to any disclaimer, the term of this patent is extended or adjusted under 35 U.S.C. 154(b) by 104 days.

(21) Appl. No.: 18/392,511

(22) Filed: Dec. 21, 2023

(65) Prior Publication Data

US 2024/0217758 A1    Jul. 4, 2024

Related U.S. Application Data

(60) Provisional application No. 63/477,849, filed on Dec. 30, 2022.

(51) Int. Cl.
*B65G 54/02*     (2006.01)
*H02K 41/02*     (2006.01)
*H02K 41/03*     (2006.01)

(52) U.S. Cl.
CPC ........... *B65G 54/02* (2013.01); *H02K 41/031* (2013.01); *B65G 2811/09* (2013.01); *H02K 41/02* (2013.01)

(58) Field of Classification Search
CPC .... B65G 54/02; B65G 2811/09; H02K 41/02; H02K 41/031

USPC .................................................. 198/619, 805
See application file for complete search history.

(56) References Cited

U.S. PATENT DOCUMENTS 3,749,025 A  *  7/1973  Giraud .................. B65G 23/00
                                                     104/294

FOREIGN PATENT DOCUMENTS

| DE | 10030815 A1 | * | 5/2001 | ........... H02K 41/031 |
| DE | 102004026455 A1 | * | 12/2005 | ........... B65G 47/912 |
| DE | 102013202674 A1 | * | 8/2014 | ............. B65G 47/28 |
| EP | 3653551 A1 | * | 5/2020 | ............. B65G 54/02 |
| WO | WO-2019049032 A1 | * | 3/2019 | ............. B65G 54/02 |

* cited by examiner

*Primary Examiner* — James R Bidwell
(74) *Attorney, Agent, or Firm* — Amarok IP Inc.; Neil W. Henderson

(57) ABSTRACT

A linear motor conveyor system with actuation and method for actuation including: a track; a moving element configured to move on the track, the moving element including: a main body; a sidecar; and an actuation mechanism, the actuation mechanism including: an actuator; and a sidecar linkage connecting the sidecar to the actuator, wherein the main body and sidecar are independently moveable relative to each other and the sidecar linkage is configured such that movement of the sidecar and/or main body relative to each other provides energy to the actuation mechanism. A method of actuation for a linear motor conveyor system, the method including providing a sidecar with a sidecar linkage connecting the sidecar to a main body of a moving element; and independently moving the sidecar and/or the main body relative to each other such that the sidecar linkage provides energy to an actuator provided to the moving element.

13 Claims, 22 Drawing Sheets

SYSTEM AND METHOD FOR ACTUATION IN A LINEAR MOTOR CONVEYOR SYSTEM

FIELD

The present disclosure relates generally to linear motor conveyor systems and, more particularly, to a system and method for actuation on a linear motor conveyor system.

BACKGROUND

In manufacturing environments or processes, a conveyor system is often used to move parts among stations at which operations are performed with or on the parts. One type of conveyor system is a linear motor conveyor system. In a linear motor conveyor system, a moving element is controlled to move along a track by electromotive force. In this type of system, each moving element can be controlled independently, with high speed/acceleration, and, by using a position sensing system, with precise control.

In most conveyor systems, the parts are carried by pallets, nests or the like that may include tooling or the like to hold the parts in position on the pallet/nest. In linear motor systems, the moving elements generally connect with the pallets and move the pallets among automation stations.

In some cases, it can be useful to have the ability to adjust the position of parts on the pallet, have some operation performed on the part on the pallet, or generally some kind of actuation performed in relation to the moving element and/or pallet. In some systems, power can be provided to the moving element or pallet to drive servo motors or the like. However, providing power generally requires a wired connection or the delivery of inductive power or the like.

Therefore, there is a need for an improved linear motor conveyor system and method that is capable of providing power/actuation or the like on a pallet/moving element.

SUMMARY

According to an aspect herein, there is provided a linear motor conveyor system with actuation including: a track; a moving element configured to move on the track, the moving element including: a main body; a sidecar; and an actuation mechanism, the actuation mechanism including: an actuator; and a sidecar linkage connecting the sidecar to the actuator, wherein the main body and sidecar are independently moveable on the track and the sidecar linkage is configured such that movement of the sidecar or the main body relative to the other provides energy to the actuation mechanism.

In some cases, the moving element may include at least one bearing that is supported and travels on at least one rail provided on the track and the sidecar is supported by the moving element.

In some cases, the moving element may include at least one bearing that is supported by and travels on at least one rail provided on the track and the sidecar may include at least one sidecar bearing that is also supported by and travels on the at least one rail.

In some cases, the sidecar may be housed inside a sidecar portion of or attached to the moving element. In some of these cases, the sidecar portion may be moveably connected with the main body, for example by a hinge-like mechanism or the like, to facility movement around a curved track.

In some cases, the moving element may include one or more supports configured to support the sidecar in relation to the main body.

In some cases, the actuation mechanism may include one or more gears and actuation linkages.

In some cases, the actuation mechanism may include a generator and a servo motor.

In some cases, the actuation mechanism may be configured to actuate when relative movement between the sidecar and main body is in one direction and de-actuate when the relative movement is opposite to the direction for actuation.

In some cases, the actuation mechanism is configured to provide multi-stage actuation based on a plurality of relative movements between the sidecar and main body.

In some cases, the actuation mechanism is configured to provide actuation in proportion to the amount of relative movement between the sidecar and main body.

According to another aspect herein, there is provided a method of actuation for a linear motor conveyor system having a track and at least one moving element, the method including: providing a sidecar with a sidecar linkage connecting the sidecar to a main body of the moving element; and independently moving the sidecar or the main body on the track such that the sidecar linkage provides energy to an actuator provided to the moving element.

In some cases, the independently moving may include relative movement between the sidecar and an already moving main body. For example, each of the sidecar and the main body may be moving on the track but there may still be relative movement between the sidecar and the main body.

In some cases, the moving the sidecar provides energy whether the sidecar is moving closer to or away from the main body, that is, the sidecar linkage is configured to provide energy to the actuator in either situation.

In some cases, the independently moving includes a plurality of relative movements between the sidecar and the main body and the sidecar linkage provides energy to the actuator to provide multi-stage actuation based on the plurality of relative movements between the sidecar and the main body.

Other aspects and features of the present disclosure will become apparent to those ordinarily skilled in the art upon review of the following description of specific embodiments in conjunction with the accompanying figures.

BRIEF DESCRIPTION OF THE FIGURES

Embodiments of the present disclosure will now be described, by way of example only, with reference to the attached Figures.

DETAILED DESCRIPTION

Generally, the present disclosure provides a system and method for actuation on a linear motor conveyor system. The system is sometimes referred to as a linear motor conveyor or moving element with sidecar actuation. In particular, the linear motor conveyor system uses an independently moving sidecar provided to a moving element to drive an actuation mechanism on the moving element to actuate elements, devices, mechanisms or the like on or related to the moving element.

Figure 1:
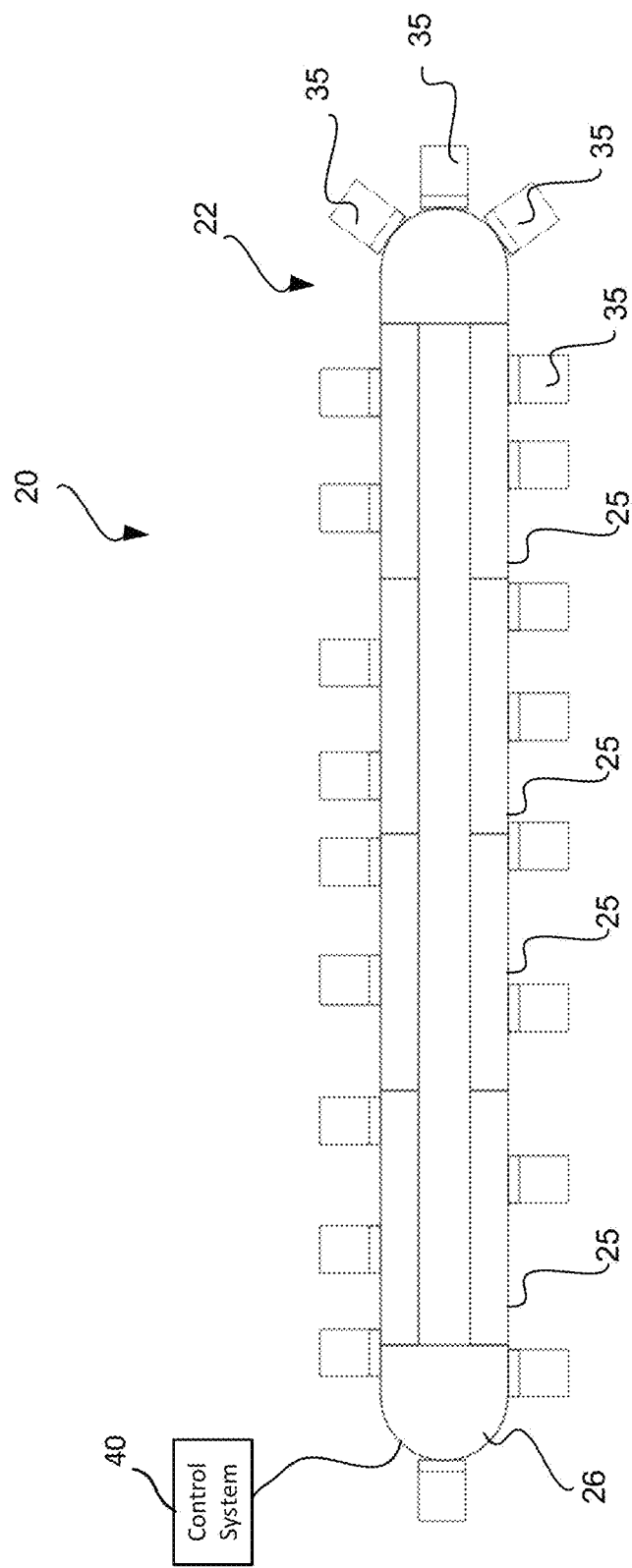
FIG. 1 is a schematic diagram of an example of a linear motor conveyor system.

FIG. 1 shows a schematic diagram of an example conveyor system 20. The conveyor system 20 includes a track 22, made up of one or more track sections 25, 26 defining the track 22. In FIG. 1, there are a plurality of straight track sections 25 with some curved sections 26. A plurality of moving elements 35 are provided to the track and move on the conveyor system 20. The moving elements 35 may support directly or include or support a pallet which may support a part, product, workpiece or the like (called a "part"). In this disclosure, the terms "moving element" and "pallet" may sometimes be used interchangeably, depending on the context.

It will be understood that the modular nature of the track sections allow for various combinations of track sections to provide various sizes and shapes of linear motor conveyor systems and any appropriate number of moving elements. In FIG. 1, the corner (or curved) track sections 26 are 180 degree turns but, in some configurations, the curved track sections 26 may have different angles such as 45, 90, 135 degree angles or the like. Some of the principles of operation of a particular type of linear motor conveyor system are described in more detail in, for example, U.S. Pat. No. 8,397,896 to Kleinikkink et al., which is hereby incorporated herein by reference.

As noted, the conveyor system 20 may include a plurality of track sections 25, 26, which are self-contained and separable from one another so as to be modular in nature. In order to be modular, each track section 25, 26 may house electronic circuitry and/or mechanical parts for powering and controlling the related track section 25, 26 and/or there may be a controller/control system 40 that controls the related track section or the track 22 overall (only one controller is shown but other controllers for track sections may be included as well). As described further below, in some cases, a track controller may communicate or interface with track section controllers provided for each of the track sections 25, 26. The controller(s) may include a processor that executes a program stored on a machine readable medium. The machine-readable medium may be a part of the controller or at a remote location or the like.

In linear motor conveyor systems, such as the linear motor conveyor system 20 shown in FIG. 1, the track 22 produces a magnetic force for moving the moving element 35 along the track 22. The magnetic force can also support or help support the moving element 35 on the track 22. The magnetic force is at least partly generated by the interaction of the magnetic flux created by magnetic elements (for example, embedded coils) of the track 22 and magnetic elements (for example, magnets) of the moving element 35.

In addition to the conveyor system, such as that shown in FIG. 1, a full manufacturing/automation system will also include automation stations, which are typically arranged adjacent to the conveyor system and are used to handle manufacturing operations on parts moving along the conveyor system. An automation station may include a single piece of equipment/machine in a production line, such as a press, pick & place device or the like, but may also include a complex system involving robots, manipulators, and the like. In some cases, automation stations/equipment may require an element on the moving element to move, grip, or otherwise actuate in some manner.

Figure 2:
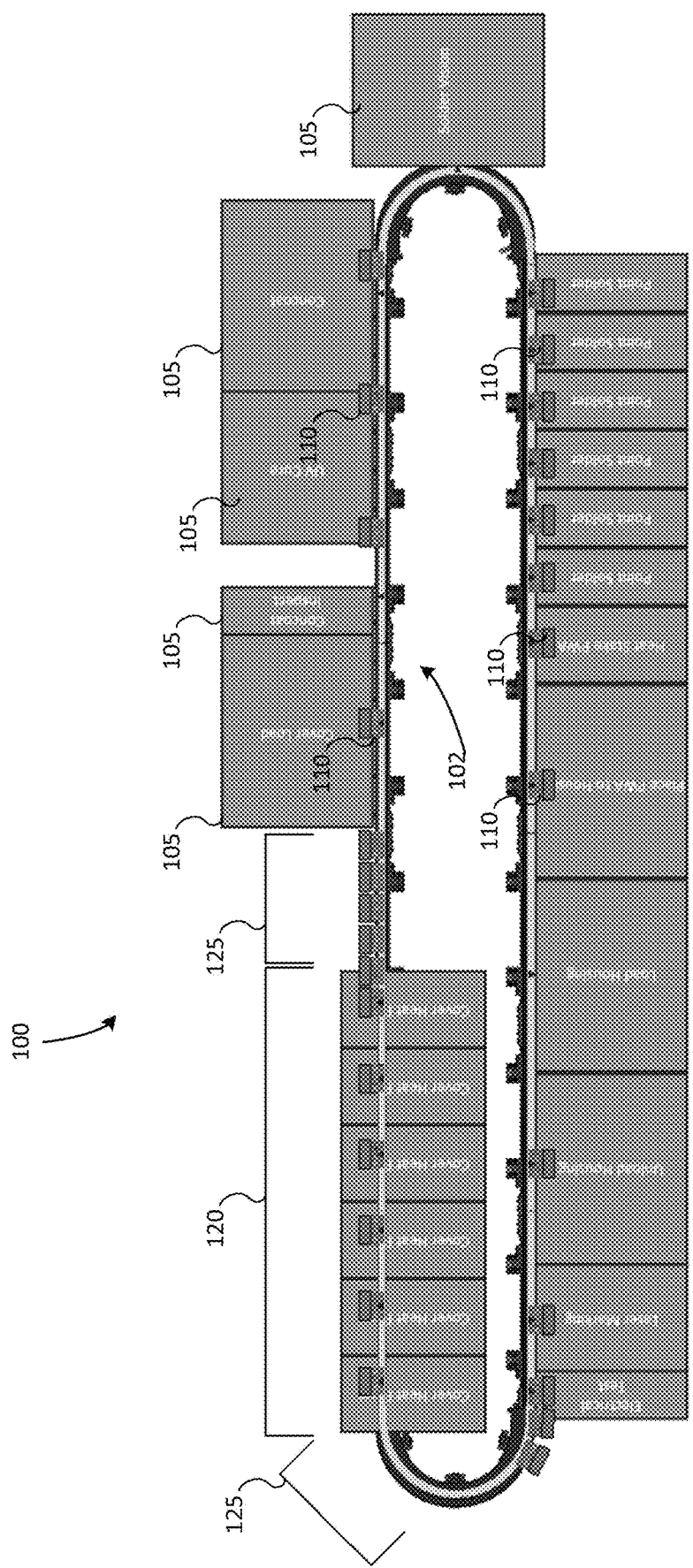
FIG. 2 is a schematic diagram of an example automation system including a linear motor conveyor system and various automation stations.

FIG. 2 shows an example configuration of an automation system 100, including a conveyor system 102 and at least one automation station 105. In this case, the conveyor system 102 is a linear motor conveyor system including a track providing a linear motor that drives moving elements along the track using magnetic fields such as that described above with regard to FIG. 1. At least one automation station, or automation element, 105 (which in the current example includes 23 automation stations 105) may be or include, for example, machines, sensors, servos, devices, or equipment, or a combination of machines, devices, or equipment, or the like. Each automation station will perform an operation or operations on a part as it moves through the automation system via the conveyor system.

Similar to the description above, the conveyor 102 includes moving elements 110 that are configured to travel on the conveyor 102 and typically stopping at one or more automation stations 105 in order to have the automation station operation/function applied to a part being carried by the moving element 110. In some cases, there may further be loading or unloading stations where the parts are placed on or removed from the moving elements. Some of the automation stations 105 will operate in an asynchronous mode or be in an asynchronous area, in which, a moving element 110 will stop at an automation station 105 and the station will operate on a part on the moving element or the like. Generally, in an asynchronous mode, the conveyor system and automation stations 105 can accommodate variable cycle times and loading. However, in some areas, the conveyor system 102 and automation stations 105 may operate in a synchronization mode or synchronization area (indicated as synchronization area 120), in order to achieve higher speed throughput for automation stations that may be controlled by software or mechanical methods to work synchronously. For example, the automation station may be cammed either mechanically or via software—to repeat an action in a predefined manner continuously. These synchronous automation stations would generally have fixed cycle times, which requires synchronization, for example, by following a master signal (which may be a software signal or the like as described in further detail in the description of FIG. 3). Similarly, moving elements 110 could be configured to follow a predefined motion profile, within the synchronous area 120, based on the master signal. In automation systems 100 where not all automation stations 105 are synchronized in some way, transitioning between an asynchronous area and a synchronous area 120 can sometimes require a merging zone 125. The merging zone 125 can be used to adjust/align/synchronize a moving element 110 to the software master signal so that the moving element can begin a motion profile sequence at the appropriate timing for entering the synchronous area 120.

Figure 3:
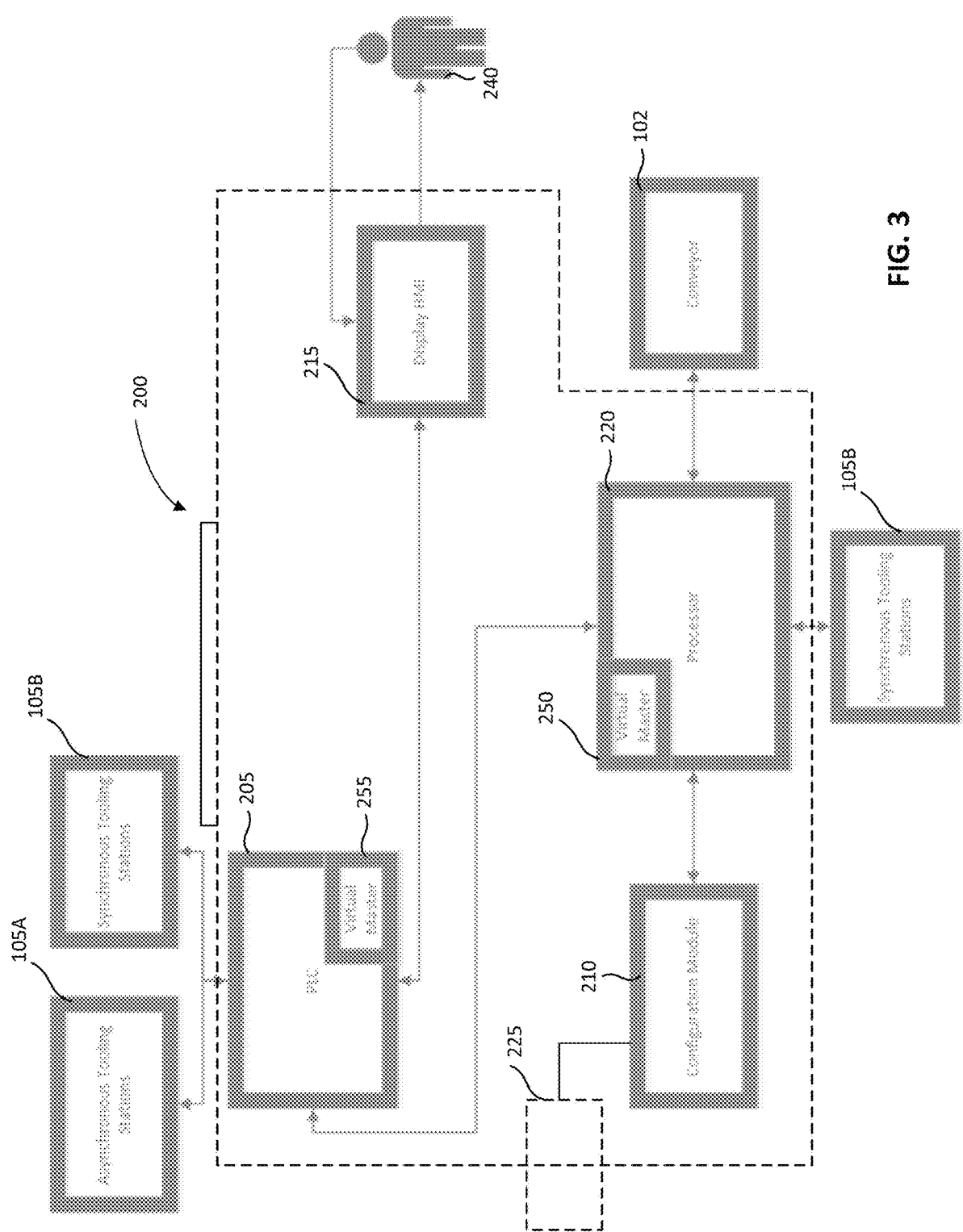
FIG. 3 is a block diagram illustrating an embodiment of a system for managing an automation system.

FIG. 3 illustrates a system 200 for controlling automation systems. As noted above, the automation system 100 that is managed by the system 200 may include a conveyor 102 and a plurality of automation stations 105 and, further, the automation stations 105 may be in asynchronous areas/zones (automation stations 105A) or synchronous areas/zones (automation stations 105B). The system 200 includes one or more programmable logic controllers (PLC) 205 (which are typically associated with an automation station or a track section and control the elements of the automation station or of the track section), a configuration module 210, a display/interface 215, and at least one processor 220. The configuration module 210 may include a connection to an internal or external data source, such as a database 225 or the like.

The PLC 210 and the processor 220 can be configured to allow input of and/or receive data related to various parameters related to the automation system. For example, there may be a display/interface (human machine interface (HMI)) 215 for a user 240 to input data related to the automation system, including the conveyor and the automation stations. In some cases, there may be access to one or more outside data sources 225, via, for example the configuration module 210, for data from third party data sources, for automation station/equipment parameters and the like. The configuration module 210 may obtain various parameters from the database 225 such as, for example, previously saved data relating to known or previously input automation system elements or the like. The input or received data may be stored in the database 225 or the like. As will be understood, the database 225 may be distributed across one or several memories and may be accessed via a network or the like.

The configuration module 210 is configured to review the input data to determine the parameters related to configuration of the automation system. The configuration module 210 takes input data, for example, relating to manufacturer, product name/number, functionality, or the like and prepares a configuration of the automation system that can account for synchronization details such as communication protocol conversion, latency times, and the like. The configuration module 210 may also allow for further input and adjustments to be made by, for example, a user or users 240.

Generally, the configuration module 210 is configured to review the input data and configuration parameters and make adjustments so that the automation stations and conveyor can be in communication and synchronously controlled (i.e. move in a synchronous manner under the control of a master signal) in synchronous zones/areas.

The display/interface 215 provides output information to the end user 240. The processor 220 processes data from the PLC 205 and provides processing power to the configuration module 210 for performing embodiments of the method of managing automation systems described herein. The processor 220 also provides output to the display.

Each of the PLC 205 and the processor 220 may include a master control to provide the master control signal used in synchronous areas. The master control may be in hardware or software (virtual). In this example, the processor 220 includes a virtual software processor master 250. The PLC 205 may also have a PLC virtual master 255, which can be used in the event of external master control (where the master control will 'propagate' a master control signal/information to the processor. In some cases, the PLC will set and control the virtual master in the processor. The PLC will also generally control asynchronous areas and the asynchronous automation stations 105A. In the event of external master control, the PLC can control synchronized areas and synchronized automation stations 105B, otherwise the processor can control the synchronized areas and synchronized automation stations 105B. The configuration module 220 may be further enhanced via machine learning, artificial intelligence or the like based on results from previous configurations.

Figure 4:
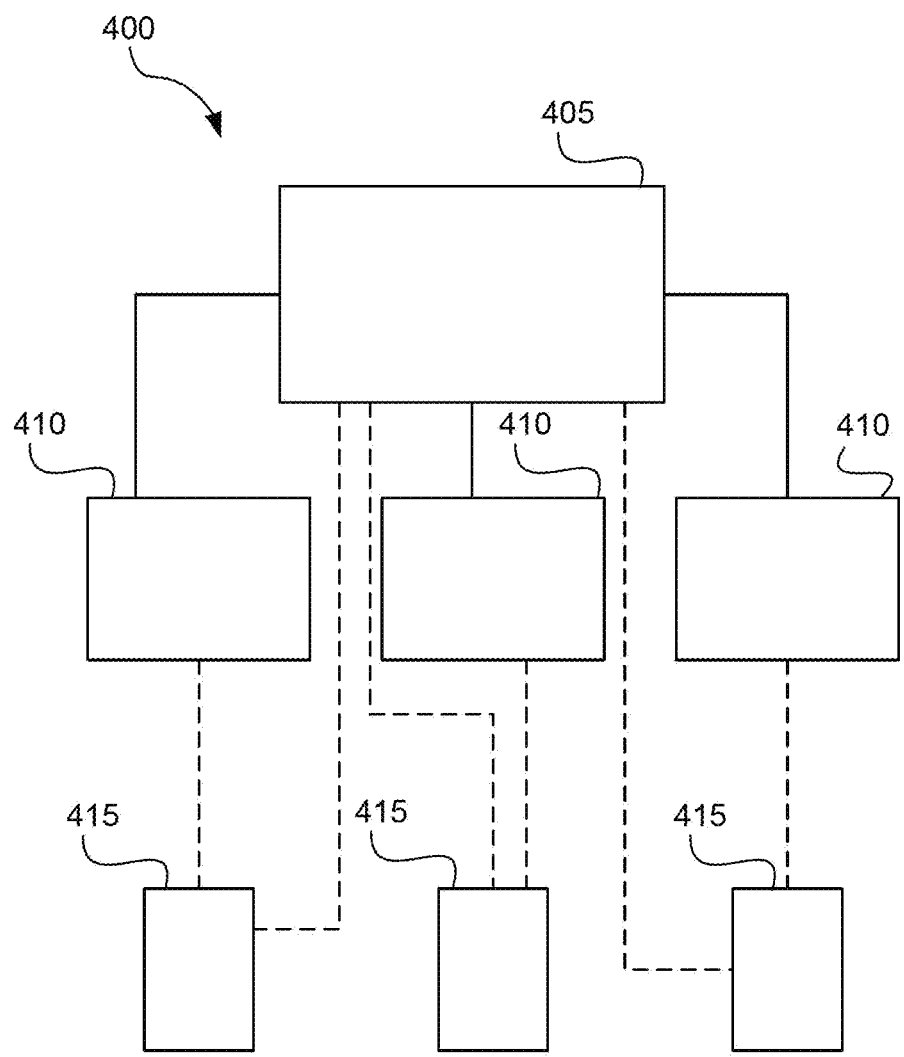
FIG. 4 is a block diagram illustrating an embodiment of a control structure for a linear motor conveyor system.

FIG. 4 is a block diagram of an example embodiment of a control system 400 for a modular linear motor conveyor system 20 such as that shown in FIG. 1 or FIG. 2. As shown in FIG. 1, the conveyor system 20 includes a controller 40. The controller 40 may be considered to be part of or be the control system 400 shown in FIG. 4 and the control system 400 is intended to be an example embodiment of a controller for a linear motor conveyor system. In some cases, the control system 400 may include a central controller 405 that controls the overall conveyor system 20. The conveyor system may also include a plurality of track section controllers 410, for example, one for each of the track sections 25, 26. Either the central controller 405 or the track section controller 410 may also control the operation of a sidecar or actuation mechanism 415 provided on the moving element (described further below). There may be control signals in both directions between the controllers. It will be understood that, in some cases, the movement of the moving element may be controlled to work in relation to or in synchronization with the operation of the sidecar or actuation mechanism for coordinated operations or the like.

In some embodiments, the track section controllers 410 may be connected to one another in a peer-to-peer communications network such that, for example, each section controller 410 may be connected to preceding and following section controllers 410 through a communications link or the like, rather than each section controller being connected to the central controller. Some alternative embodiments may include use of the central controller 405 to convey information/data between/among section controllers 410 and/or sidecar/actuation mechanisms 415 or the like.

The various controllers may be connected via, for example, input/output (I/O) or network modules or the like. In some cases, the controllers can also communicate in a wireless manner.

Figure 5A:
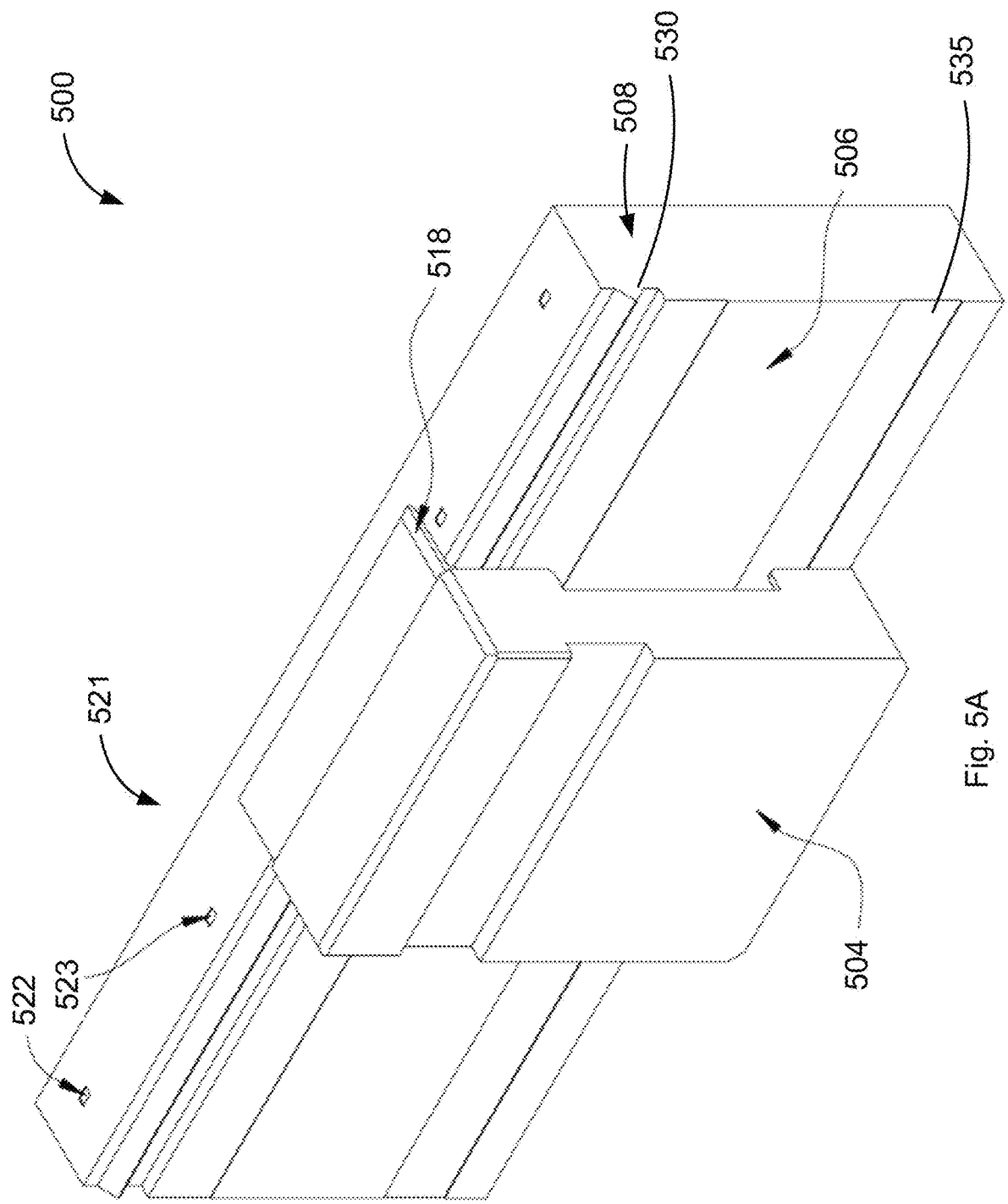
FIG. 5A is a perspective view an embodiment of a linear motor track section with moving element.

FIG. 5A is a perspective view of an embodiment of a track section 500 such as that of the linear motor conveyor system of FIG. 1 or 2. The track section 500 features one or more moving elements 504 (only one is illustrated) which are configured to ride or travel along a track portion 506 of the track section 500. The track 506 includes a frame 508 configured to support the moving element 504.

Each track section 500 can be self-contained and quickly and easily separable from one another so as to be modular in nature. In this modular example, the track sections 500 are mounted on a support (not shown) so as to align and abut one another in order to form a longer track. In order to be modular, each track section 500 can house self-contained electronic circuitry for powering and controlling the track section 500 and/or the moving element 504.

Figure 5B:
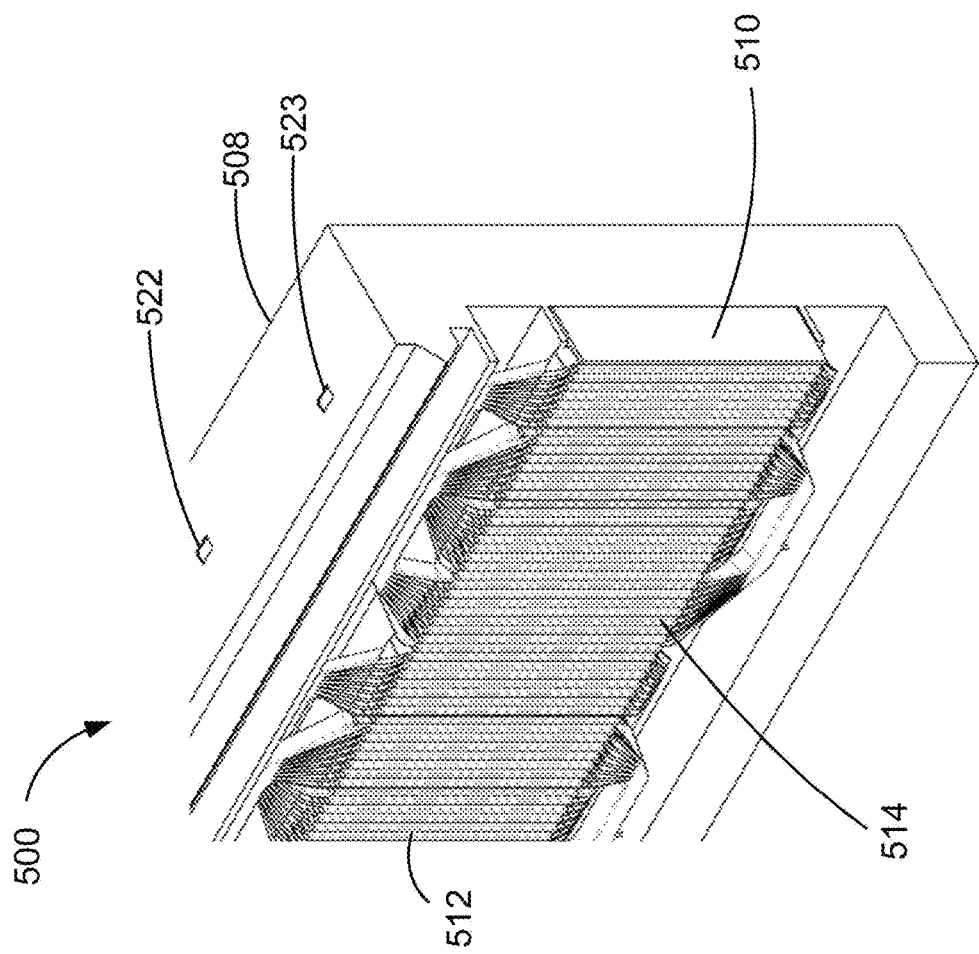
FIG. 5B is a perspective open view of the linear motor track section of FIG. 5A.

FIG. 5B illustrates a perspective open view of the track section 500. The track section 500 includes the frame 508 housing a linear drive mechanism 510. The linear drive mechanism 510 is formed as a stator armature 512 and a plurality of embedded coils 514. The embedded coils 514 can be individually excited so that an electrically-induced magnetic flux produced by the stator armature 512 can be generated adjacent to a given moving element 504 to be controlled, in a direction normal thereto, without affecting adjacent moving elements 504. The motive force for translating each moving element 504 arises from the magneto-motive (MMF) force produced by magnetic elements (described below), such as permanent magnets, provided to each moving element 504 and the stator armature 512, i.e., by the tendency of the corresponding magnetic fluxes provided by the stator armature 512 and moving element 504 to align. A controller (such as those described above) enables separate and independent moving MMFs to be produced along the length of the track section 500 for each moving element 504 so that each moving element 504 can be individually controlled with a trajectory profile that is generally independent of any other moving element 504.

Referring again to FIG. 5A, in this particular embodiment, each moving element 504 includes an extension 518 provided with a machine-readable medium (not shown), which may be, for example, a magnetic strip, an optically transmissive or reflective strip, other type of feedback system or the like. The extension 518 is configured such that the machine-readable medium interacts with sensors 522, 523 provided to the frame 508. The sensors 522, 523 are configured to read the machine-readable medium, whether magnetically, optically, or otherwise. The machine readable medium and sensors 522, 523 form a position sensing system 521.

Further, each track section can include at least one rail to support/guide the moving element 504, in this case, a first guide rail 530 and a second guide rail 535. In a particular case, the first guide rail 530 may have a "V" shaped profile while the second guide rail 535 may have a flat surface. It will be understood that rail(s) having an alternate shape may be used with corresponding wheels or bearings on the moving elements.

Figure 6:
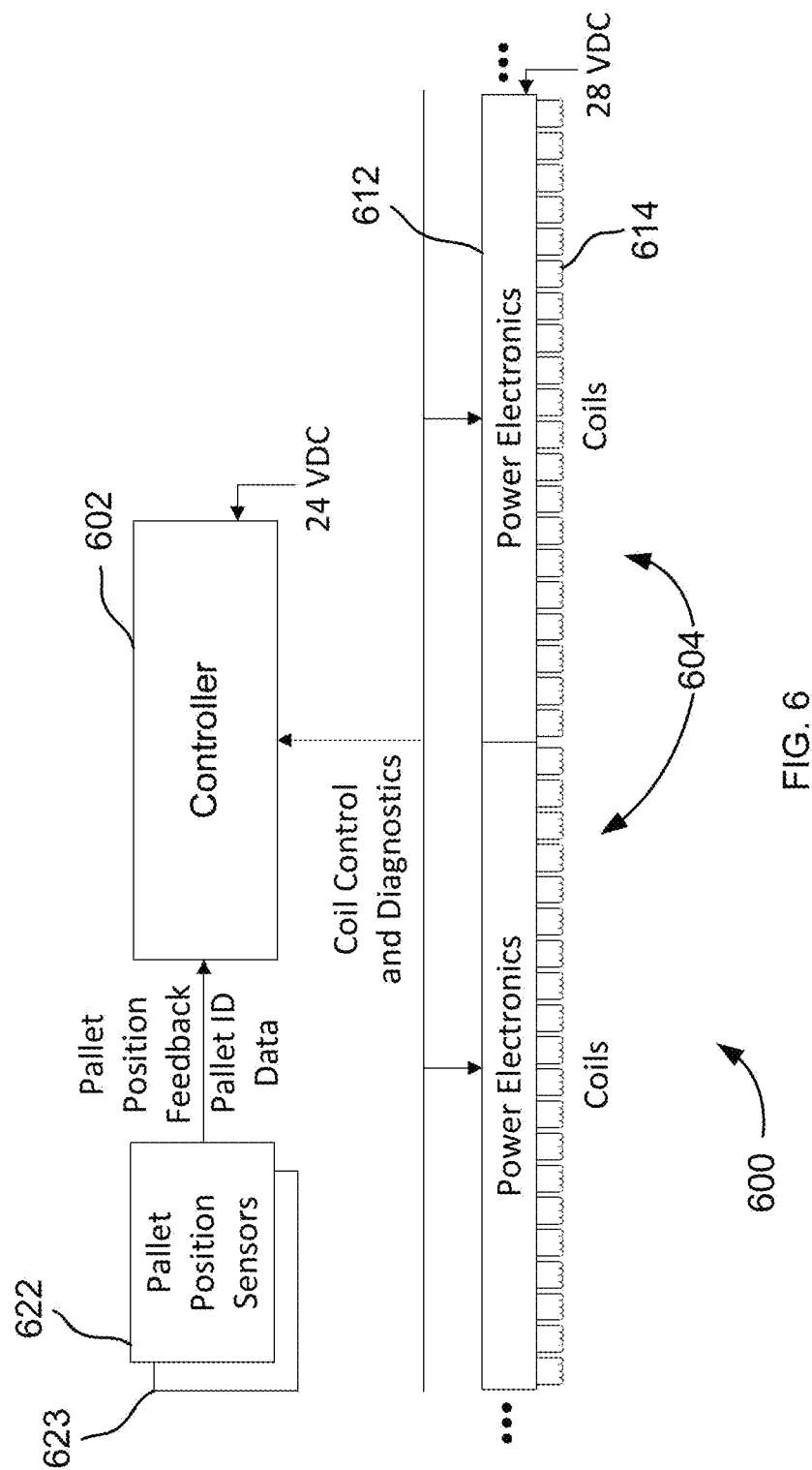
FIG. 6 is a block diagram of an embodiment of a control architecture for a linear motor conveyor system.

FIG. 6 is a block diagram of an example control architecture 600 employed in a linear motor conveyor system such as that in FIG. 1 or 2. In this embodiment, a controller 602 controls the conveyor system and the track sections 604 (two are illustrated). The controller 602 is configured to monitor the position of and control the movement of moving elements (not shown) based on the position. The controller 602 may also monitor and report moving element identification data so the moving element can be tracked throughout the conveyor system. As such, the controller 602 may be used for process (i.e. manufacturing-line) control. The controller 602 may also provide a supervisory diagnostic role by monitoring the track sections 604 (e.g., by engaging in a continuous polling or pushing process) in order to determine the current status of any track section 604 and whether any track section 604 has failed. It will be understood that, in some cases, there may be additional controllers 602 and each may directly control each of the track sections 604.

The controller 602 may also be connected to other devices, such as programmable logic controllers (PLCs) (not shown) via input/output (I/O) or network modules. The PLCs may provide manufacturing-line station-processing instructions to the track section 604, such as directing the next destination for a moving element along the track, providing station-specific motion instructions in respect of a given moving element, or the like.

As illustrated, the controller 602 can be connected to a stator armature 612 and coils 614 in the track sections 604 and controls the coils 614 in accordance with an independent trajectory or "move" command for each moving element located thereon.

The controller 602 may also be connected to sensors 622, 623 situated in the track section 604. The controller 602 can be configured to implement a closed-loop digital servo control system that controls movement of the moving element by resolving the real-time position of each moving element located in the track section(s) 604. The controller 602 makes use of the sensors 622, 623, which can supply moving element identification data and moving element position data to the controller 602.

Figure 7A:
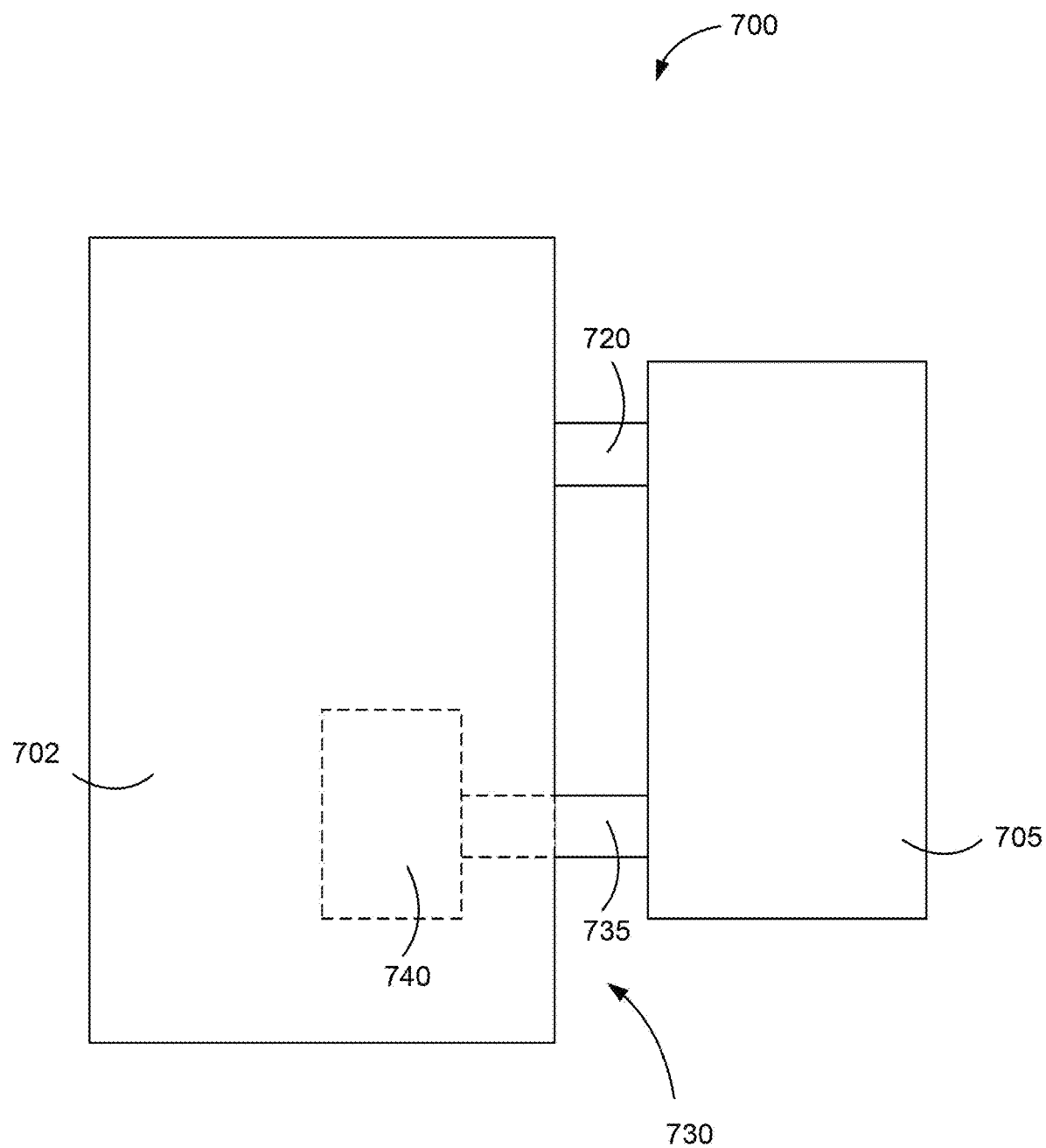
FIG. 7A is a schematic front view of a moving element with sidecar according to an embodiment.
Figure 7B:
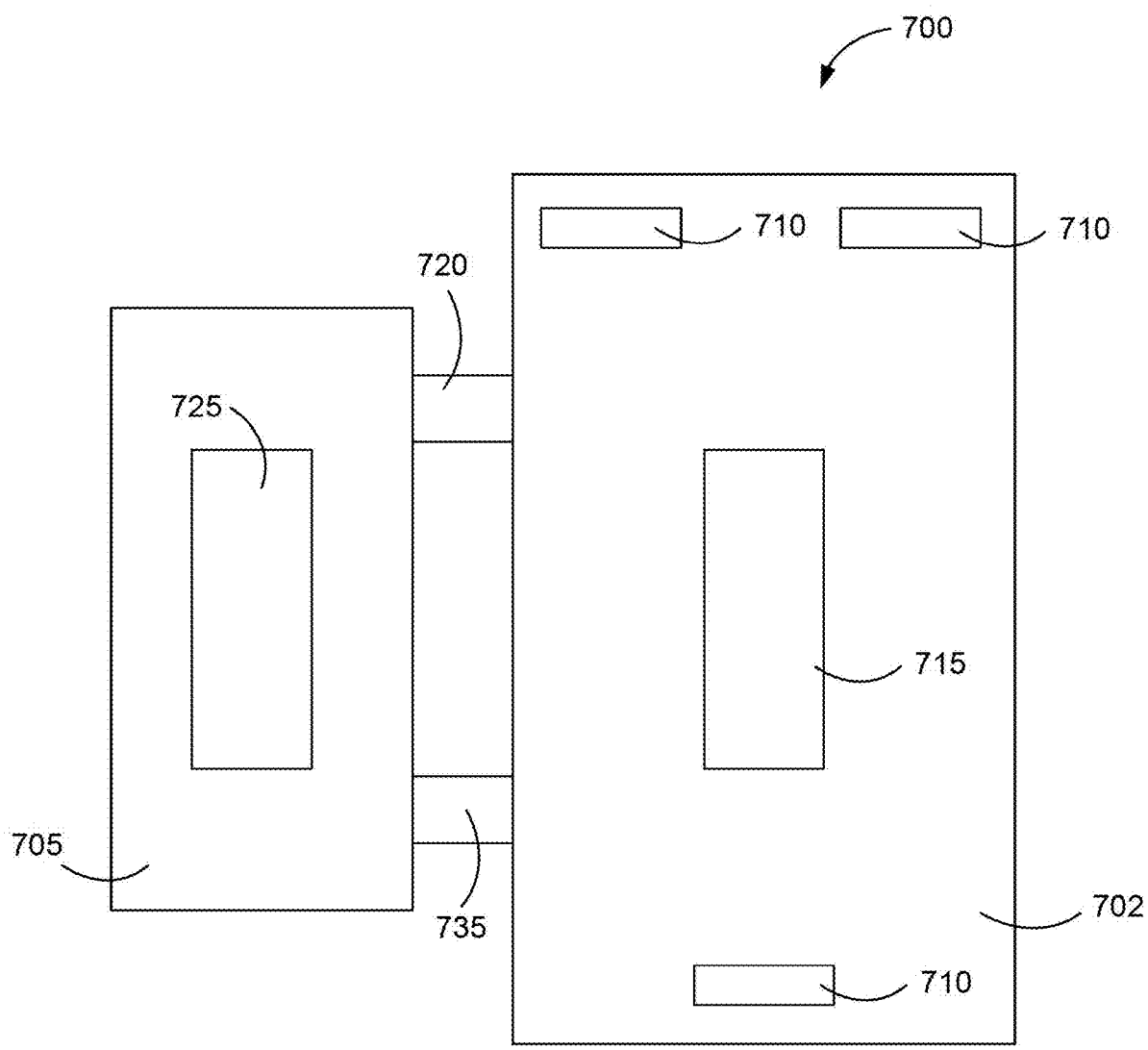
FIG. 7B is a schematic rear view of the moving element with sidecar of FIG. 7A.

FIGS. 7A and 7B illustrate front and rear schematic views of a moving element 700 according to an embodiment. The moving element 700 can be somewhat similar to the moving element 504 described above in relation to FIG. 5A and can operate on a linear motor conveyor system similar to those described above. In this embodiment, the moving element 700 includes a main body 702 that is provided with a sidecar 705, that is, an independently moveable portion that is connected in some way to the main body 702.

As shown in FIG. 7B, each moving element 700 includes at least one bearing or wheel 710, wherein the profile of the wheel is configured to correspond to the profile of the rail on the track section (for example, "V"-shaped, flat, or the like as described above). In this case, there are two bearings 710 at the top and one bearing 710 at the bottom. The moving element 700 also includes a magnetic element 715, in this case, a permanent magnet, that interacts with magnetic elements (for example, coils as described above) in the track sections to move the moving element 700 along the conveyor track.

In this embodiment, the sidecar 705 is connected to the main body 702 by one or more supports 720. The supports 720 are configured such that the sidecar 705 is supported beside the main body 702 but can move relative to the main body 702, or can remain stationary while the main body 702 moves (in this case, the sidecar 705 or main body 702 move laterally along the direction of the track in relation to one another). The sidecar 705 includes a sidecar magnetic element 725 that allows for control of the movement of the sidecar 705 independently to movement of the main body 702. The sidecar 705 has independent movement from the main body 702 due to the nature of the linear motor and the ability to control the coils adjacent to a given magnetic element on the main body or the sidecar.

The moving element 700 includes an actuation mechanism 730, which can be operated by energy (mechanical, electrical, or the like) generated by movement of the sidecar 705 and/or main body 702 relative to each other. It will be understood that relative movement can also include moving each of the sidecar 705 and main body 702 at different speeds. Generally speaking, the actuation mechanism 730 can be energized/operated by changing a relative distance between a fixed point on the sidecar 705 and a fixed point of main body 702.

The actuation mechanism 730 includes a sidecar linkage 735 and an actuator 740. The actuation mechanism 730 may be any of various types that turn linear motion into actuation/energy, for example, pistons, gears, generators, or the like, which can provide for moving, clamping, lifting, rotation, or the like on the moving element. In some cases, the sidecar 705 may be supported by the sidecar linkage 735 and not require supports 720.

Figure 7C:
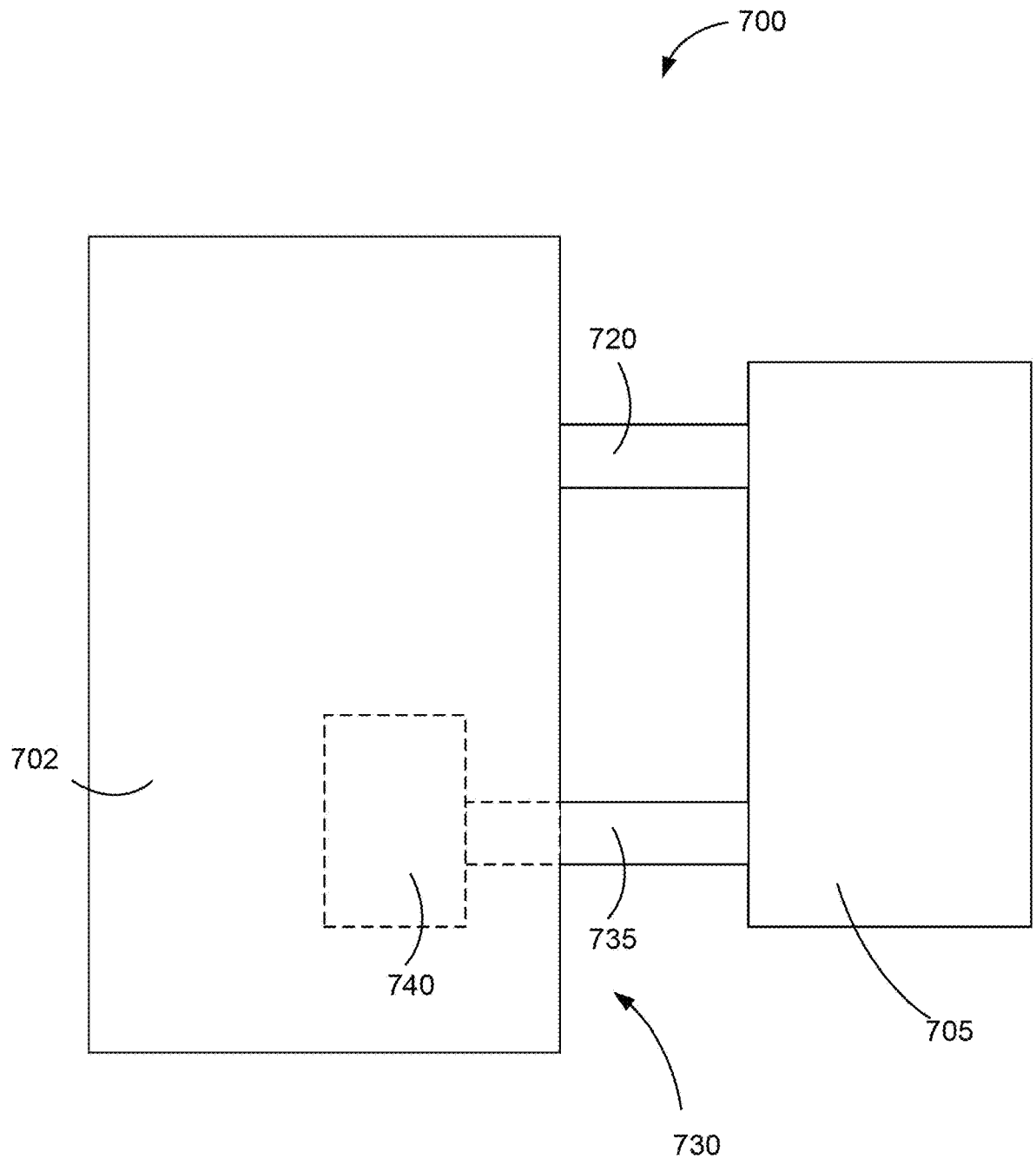
FIG. 7C is a schematic front view of the moving element with sidecar of FIG. 7A when the sidecar and main body are in a different position relative to each other.

FIG. 7C is a schematic front view of the moving element 700 when the sidecar 705 and/or main body 702 have been moved relative to each other into a different position than that shown in FIGS. 7A and 7B. The movement causes the actuation mechanism to operate. In some cases, an opposite movement of the sidecar 705 and the main body 702 relative to each other may reverse the actuation performed during the actuation movement (sometimes referred to as de-activation). It will be understood that this type of movement is not required for de-activation but is an option.

Figure 7D:
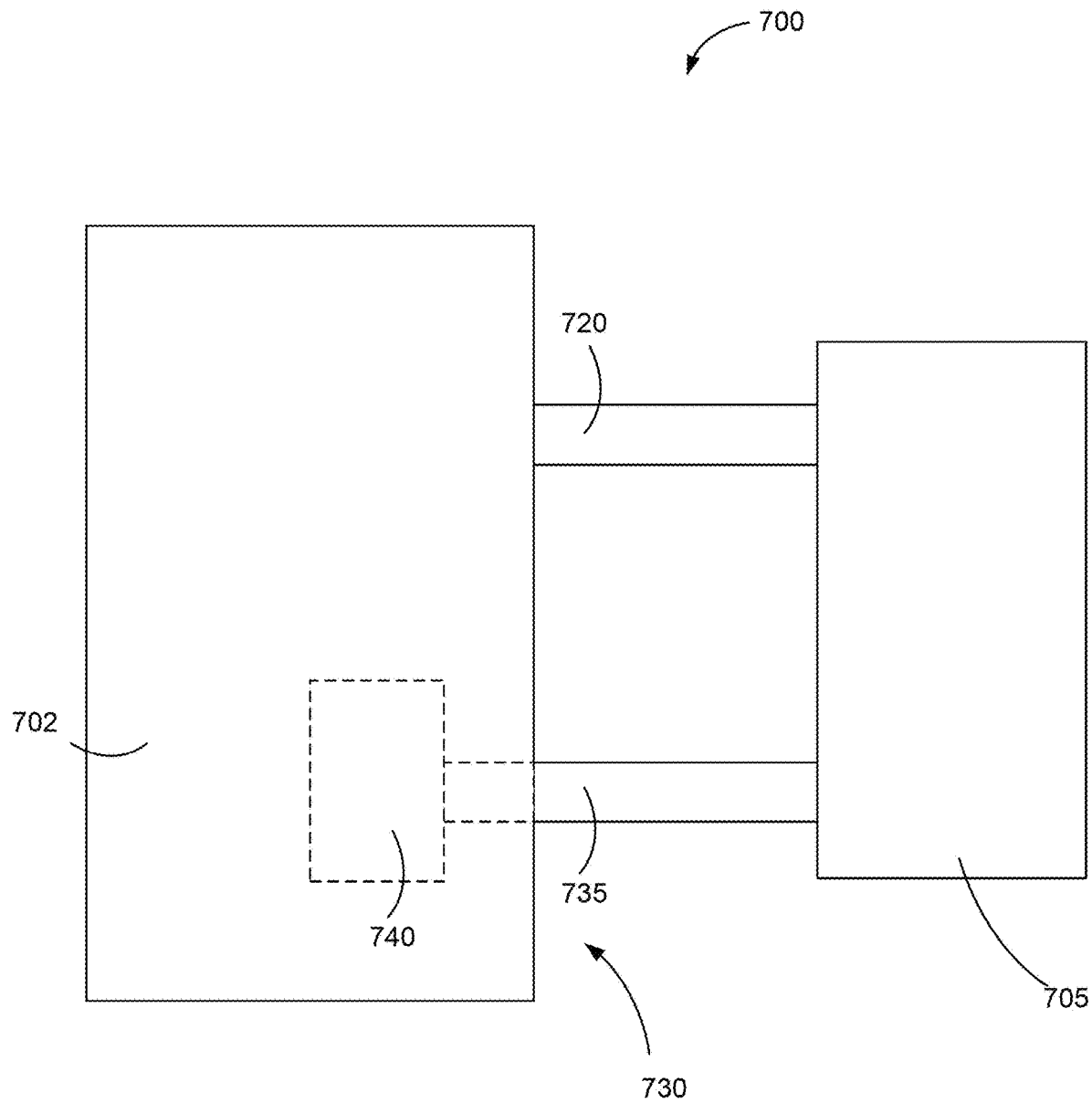
FIG. 7D is a schematic front view of the moving element with sidecar of FIG. 7A when the sidecar and main body are in a further different position relative to each other.

FIG. 7D is a schematic front view of the moving element 700 when the sidecar 705 and/or main body 702 have been further moved relative to each other, such that a relative distance between fixed points on the sidecar 705 and main body 702 is different from that shown in FIG. 7C. In this case, this further change in the distance may cause the actuation mechanism 730 to perform a further actuation, which may be unrelated to the actuation caused in FIG. 7C or may be a progressive step in an actuation commenced in FIG. 7C, which may include further additional steps. In some cases, the actuation may be proportional to the change in distance between the sidecar 705 and the main body 702 in either a continuous or step-wise fashion.

As noted above, the controller 602 controls the coils of the linear motor via control signals and, as such, controls the movement of both the sidecar and moving element. In this way, the controller 602 can be configured to provide the relative movement between the sidecar and moving element to produce the actuation or de-actuation at a desired location/timing. The controller 602 can be configured to act on either, or a combination, of internal (for example, moving element position on the track) or external (for example, wireless signal from an automation station) triggers and the like.

Figure 8A:
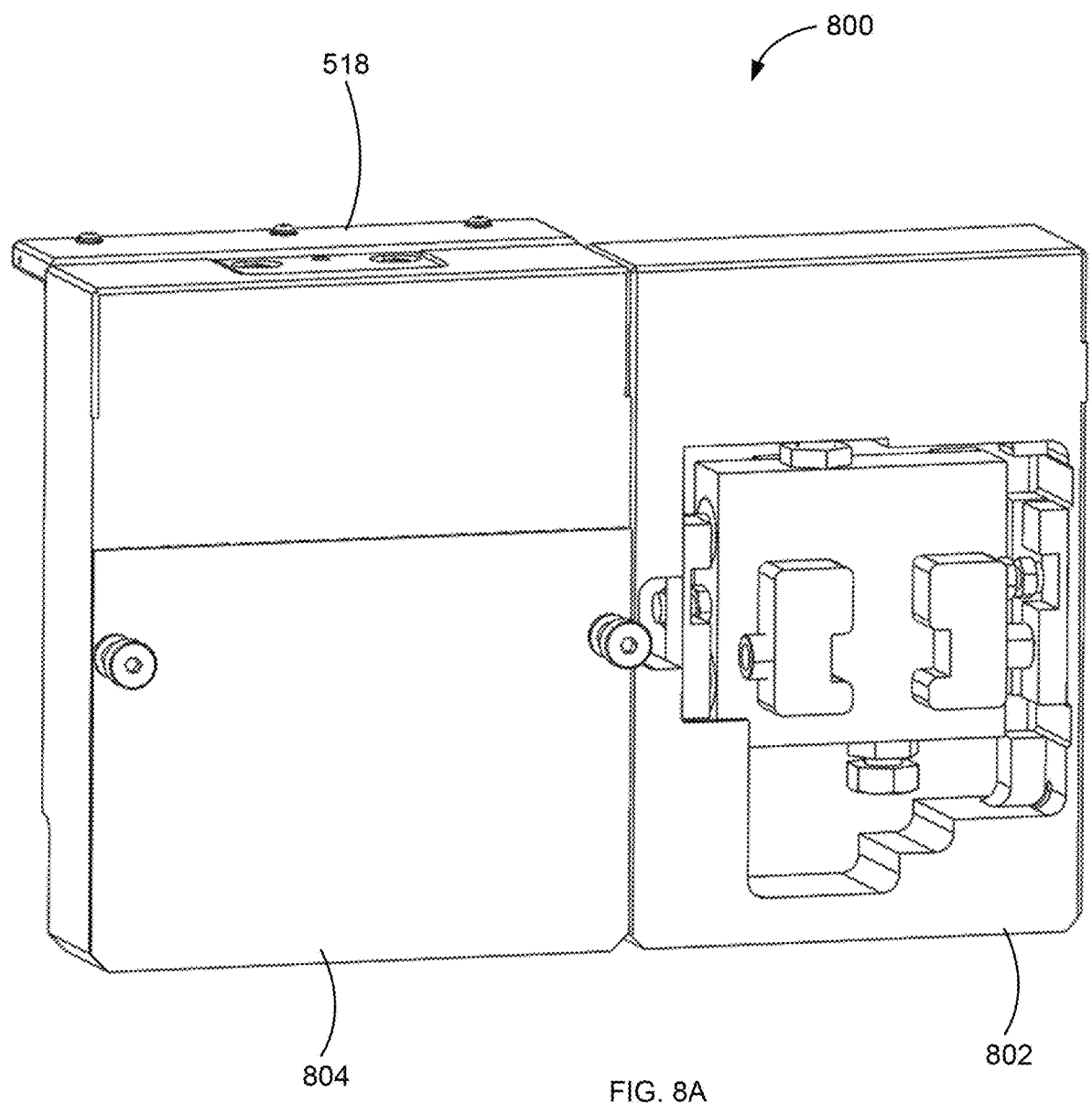
FIG. 8A is a front perspective view of another embodiment of a moving element with sidecar, in which a portion of the moving element has been cut away.
Figure 8B:
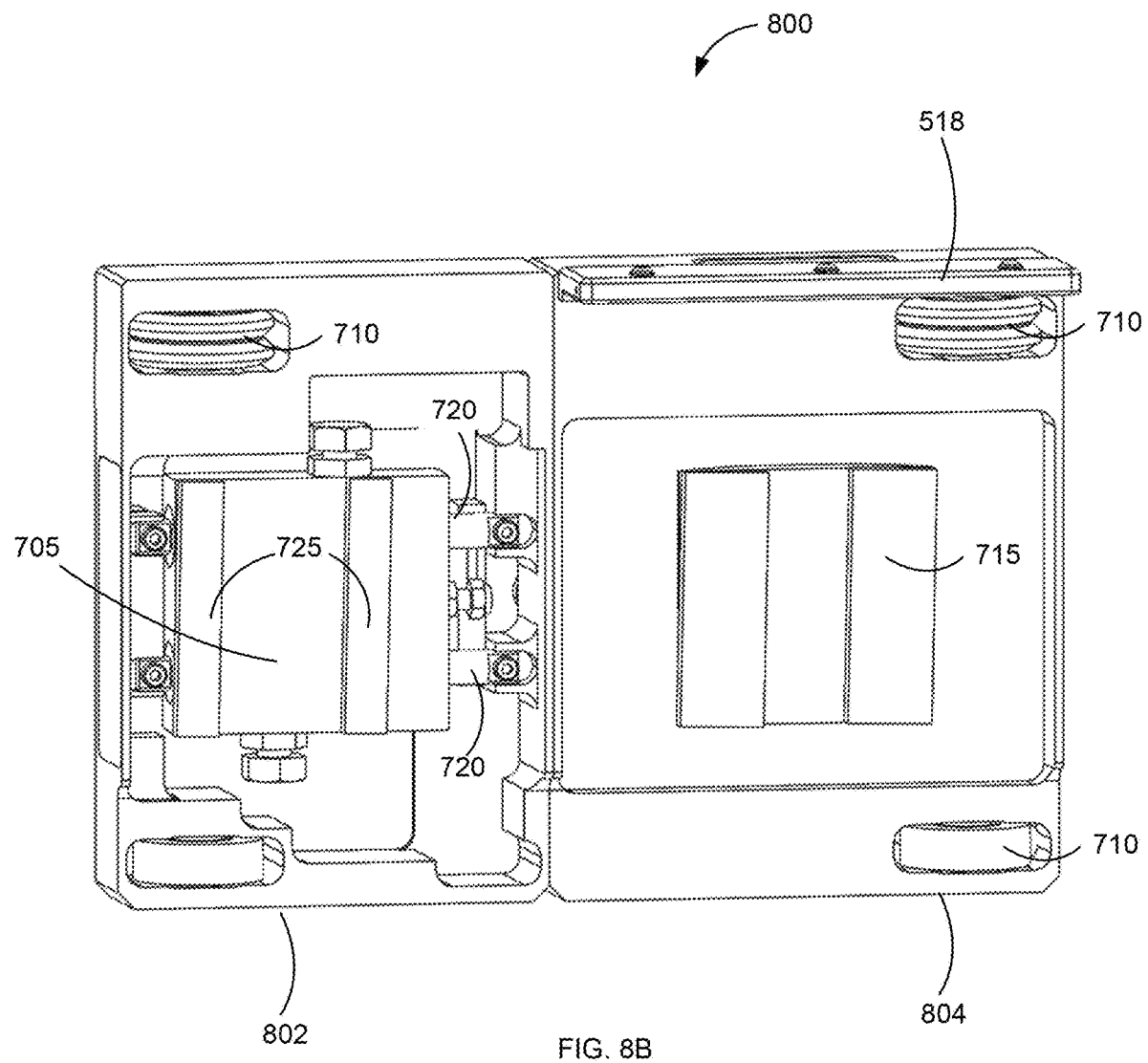
FIG. 8B is a rear perspective view of the moving element with sidecar of FIG. 8A, with a portion of the moving element cut away to reveal the sidecar.
Figure 8C:
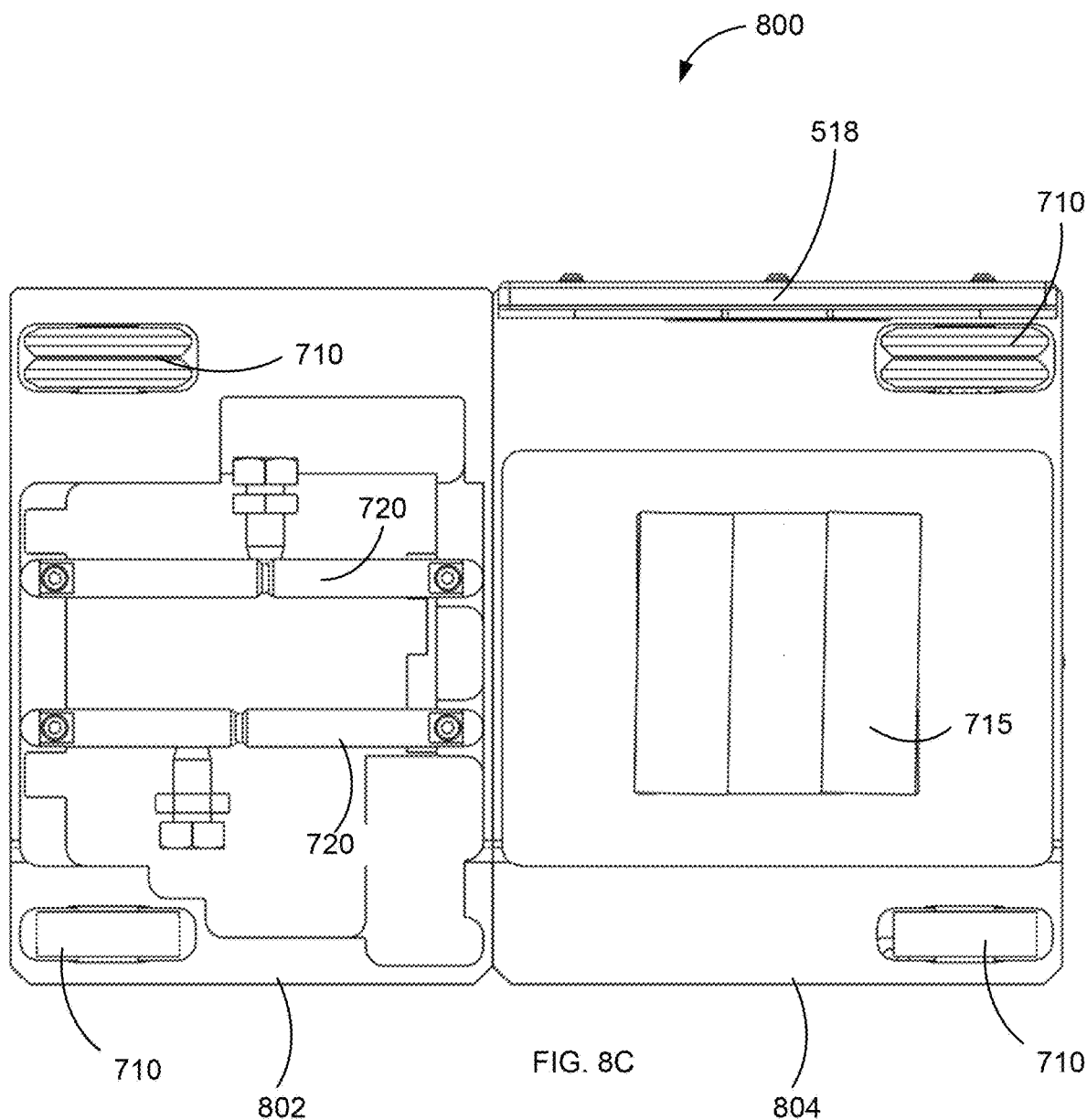
FIG. 8C is a rear perspective view of the moving element with sidecar of FIG. 8A, with the sidecar removed.

FIG. 8A is a perspective front view, FIG. 8B is a perspective rear view, and FIG. 8C is a perspective rear view of another embodiment of a moving element 800. The moving element 800 has some similar elements to that of FIGS. 7A to 7C and similar elements will use similar reference numbers. In this embodiment, the sidecar 705 is housed within a sidecar portion 802 of the moving element 800, which is provided to the main body 804 of the moving element. The sidecar 705 is supported by two supports 720. The actuation mechanism 730 is not shown in FIGS. 8A through 8C. The moving element 800 includes a plurality of bearings 710, some of which, in this embodiment, are on the sidecar portion 802, to support the moving element 800 and sidecar portion 802. It will be understood that various arrangements of bearings may be possible, such as three bearings, separate bearings for moving element and sidecar, bearings for just the main body, or the like. The moving element 800 includes two magnetic elements 715 and the sidecar 705 includes two sidecar magnetic elements 725 to interact with the linear motor on the track section. It will also be understood that the number of magnetic elements is flexible depending on the application or the like. The moving element 800 includes an extension 518 and machine readable medium, similar to the embodiment of FIG. 5A. It will be understood that the extension and machine-readable medium may also be configured in various ways. For example, just on the moving element, on both the moving element and sidecar portion, or a separate machine-readable medium for each of the moving element and sidecar portion. In some cases, the sidecar itself may have a separate machine readable medium to track the movement of the sidecar. Tracking the movement of the sidecar can allow for more precise control of the sidecar and, thereby, the actuation performed.

Figure 8D:
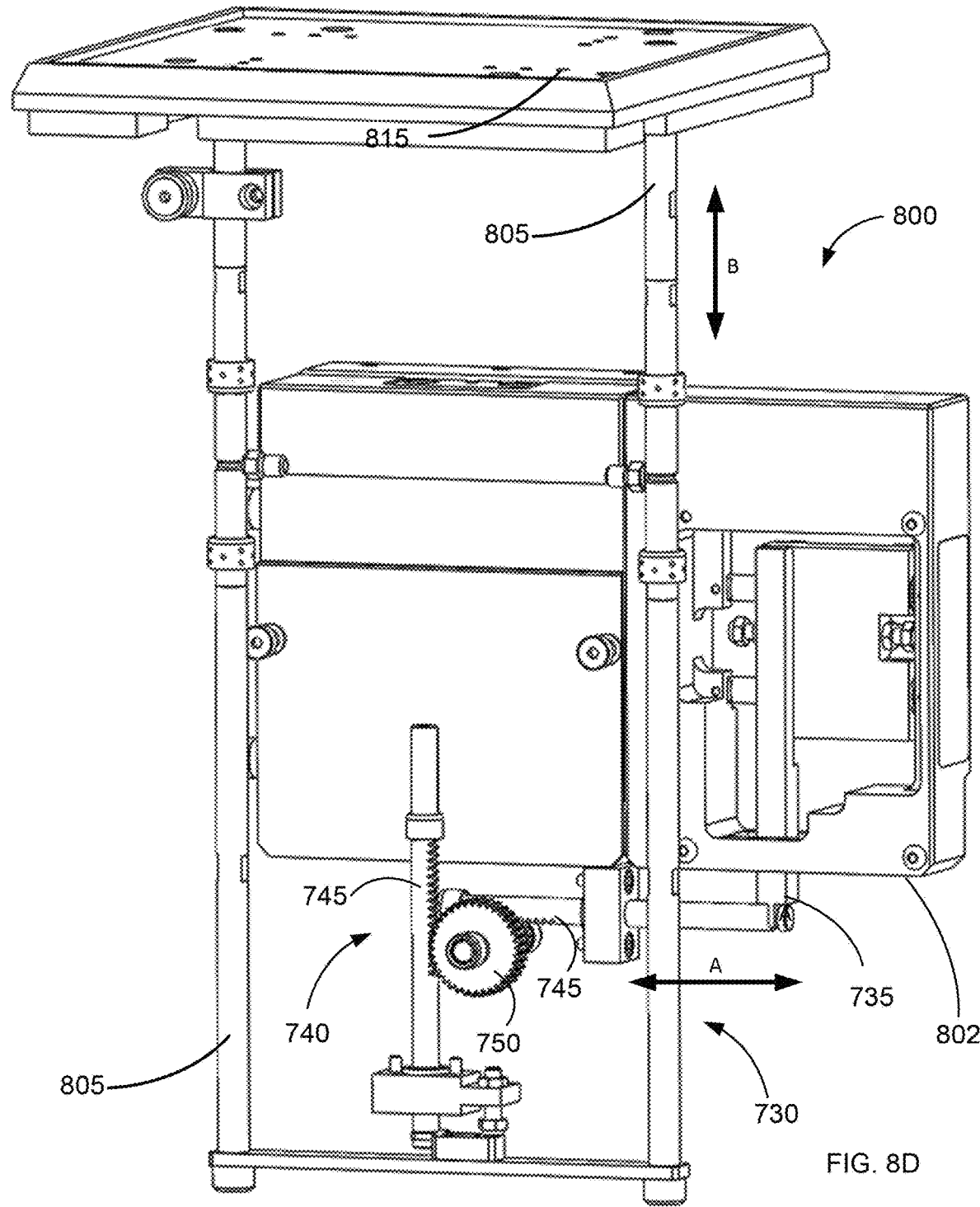
FIG. 8D is a front perspective view of the moving element with sidecar of FIG. 8A, with a cut away illustrating an actuation mechanism.
Figure 8E:
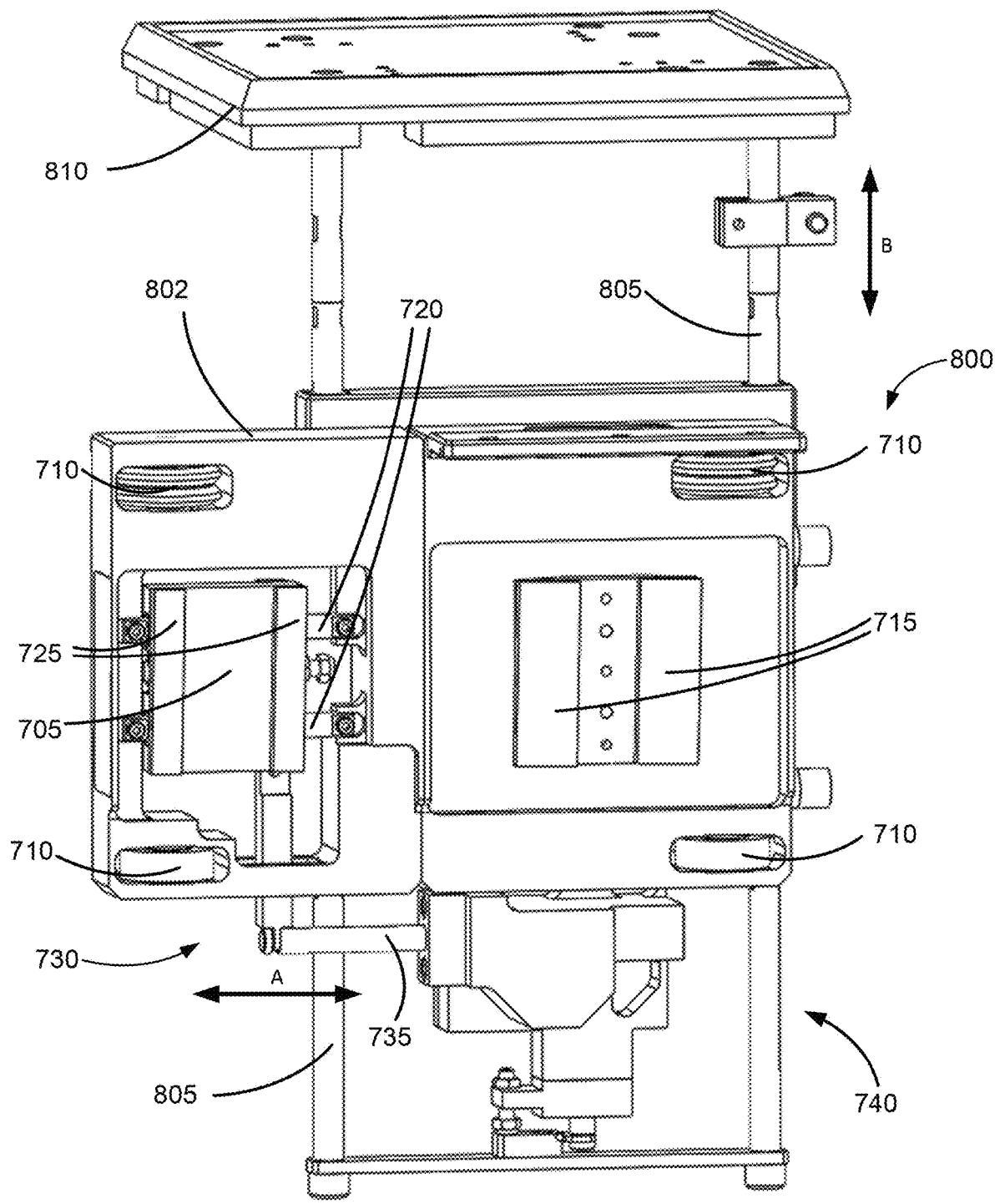
FIG. 8E is a rear perspective view of the moving element with sidecar of FIG. 8D.

FIG. 8D is a perspective front view and FIG. 8E is a perspective rear view of the moving element 800 of FIG. 8A illustrating an activation mechanism 730. The moving element 800 has some similar elements to that of FIGS. 7A to 7C and similar elements will use similar reference numbers. In this embodiment, the sidecar 705 is housed within a portion 802 of the moving element 800. The sidecar is supported by two supports 720. The actuation mechanism 730, including the sidecar linkage 735, is located below the sidecar, connecting to the actuator 740 provided to the main body 702. The moving element 800 includes a plurality of bearings 710, some of which are on the portion 802, to support the moving element 800. The moving element 800 includes two magnetic elements 715 and the sidecar 705 includes two sidecar magnetic elements 725 to interact with the linear motor on the track section.

In this embodiment, as shown in FIG. 8D, the actuator 740 includes two rod gears 745 and a circular gear 750 to translate the relative movement of the sidecar 705 (shown as arrow "A") and sidecar linkage 735 to an orthogonal movement (shown as arrow "B") of pins 805 that engage with a pallet 810 or the like. In this embodiment, movement of the sidecar relative to the moving element in one direction can engage the pins with the pallet, while movement in an opposite direction can disengage the pins from the pallet. It will be understood by one of skill in the art that various other actuators, sidecar linkages, and actuation mechanisms may be used to obtain various type of actuation, including engagement, gripping, movement, rotation, a reciprocating pump, and all of the various mechanical arrangements that are known or can be developed in the art. Further, an actuation may take the form of energy generation via a generator or the like and the use of servos or the like for that actuation.

Figure 9A:
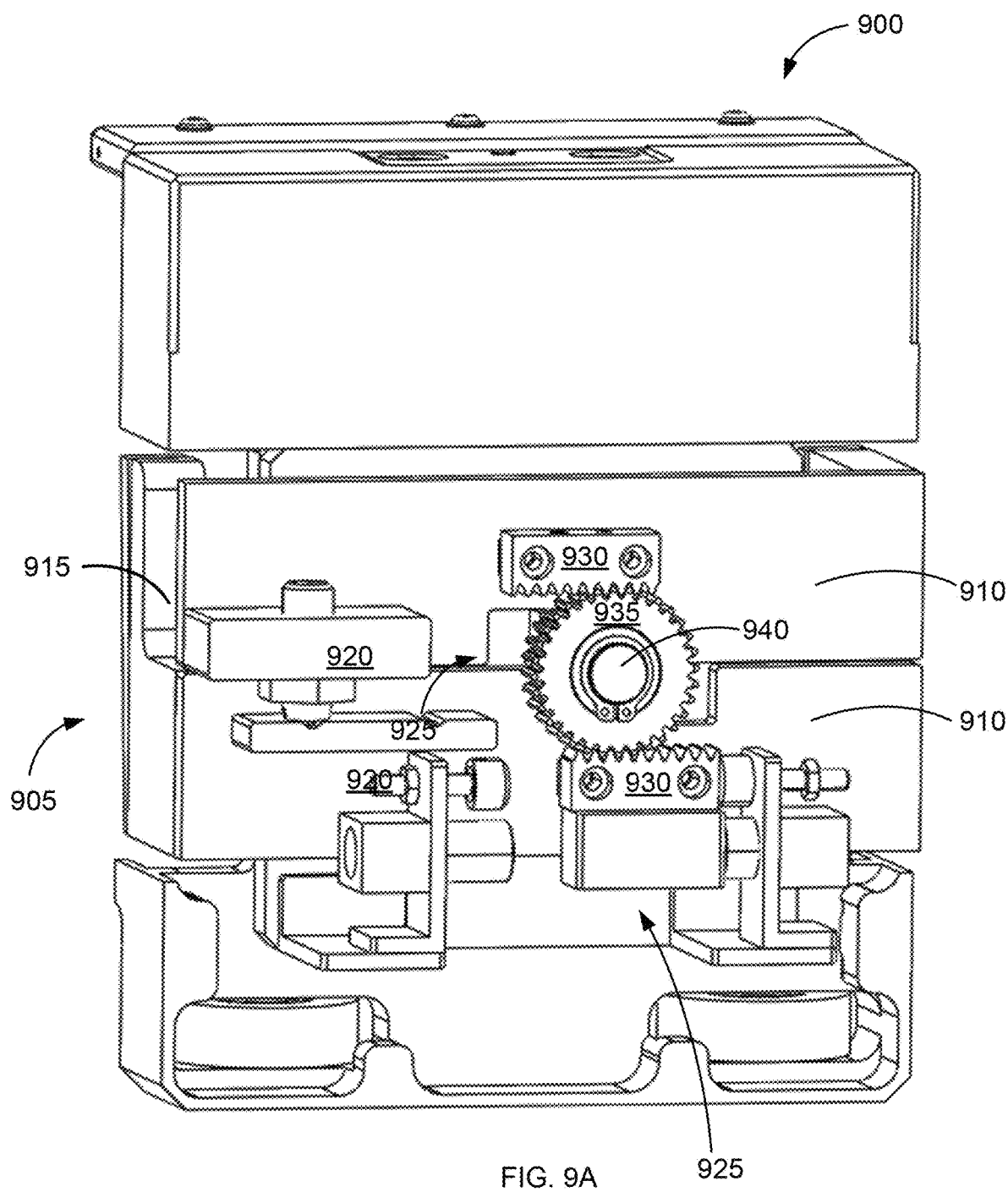
FIG. 9A is a front perspective view of another embodiment of a moving element with sidecar.
Figure 9B:
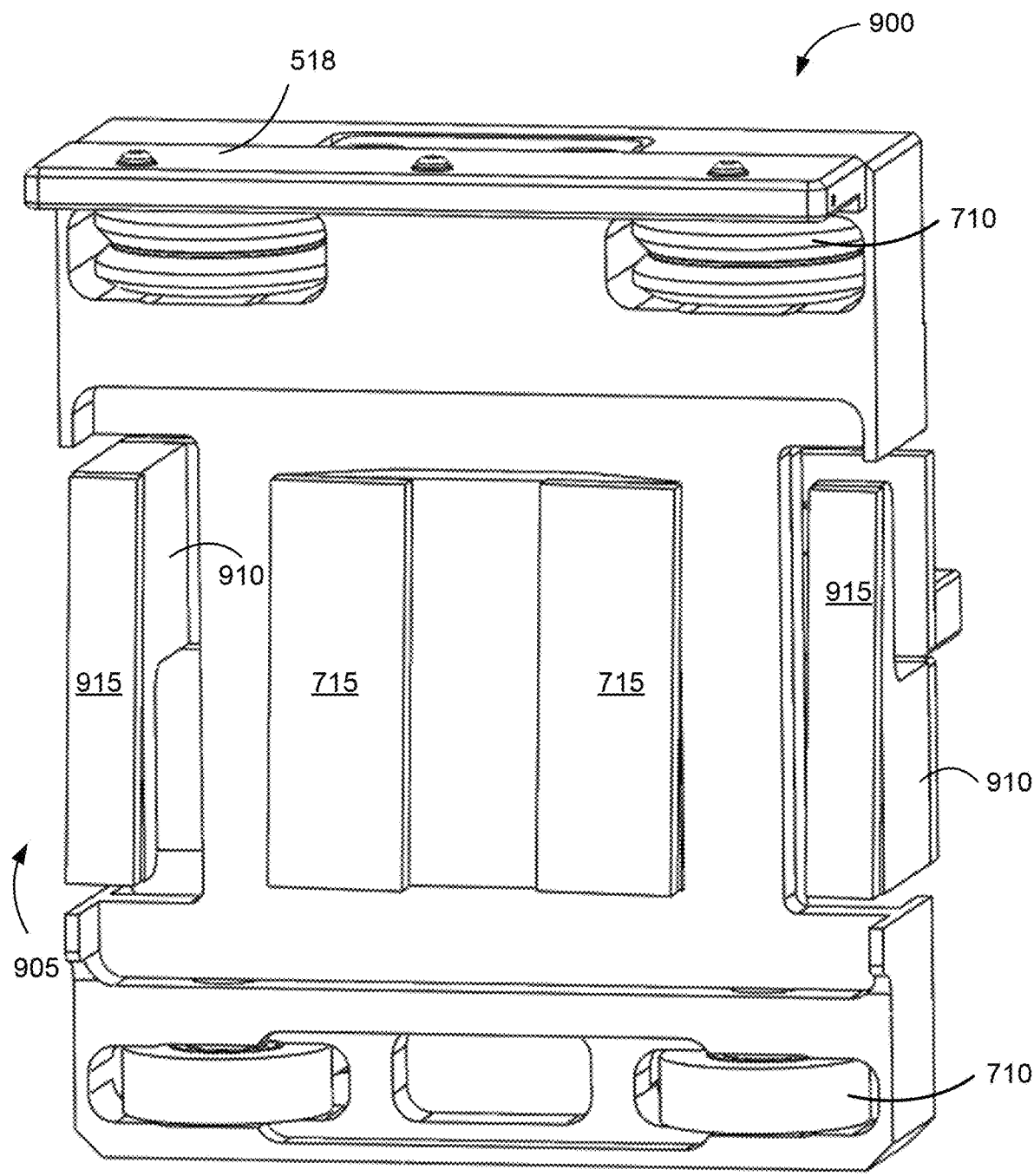
FIG. 9B is a rear perspective view of the moving element with sidecar of FIG. 9A.

FIG. 9A is a perspective front view and FIG. 9B is a perspective rear view of another embodiment of a moving element 900. The moving element 900 has some similar elements as earlier embodiments and similar elements will use similar reference numbers. In this embodiment, the sidecar 905 is formed as two separate sidecar elements 910 on opposite sides of the moving element, along the direction of the track. Each sidecar element 910 includes a sidecar magnetic element 915 to allow for control of movement of the sidecar element 910. The sidecar magnetic element 915 is provided to a sidecar element body 920 that is configured to allow movement of each sidecar element 910 in relation to the moving element 900. In this case, an alternative sidecar linkage 925 is provided to translate sidecar element 910 movement into actuation. In this example, the sidecar linkage 925 includes a linear gear 930 attached to each sidecar element 910 and a circular gear 935 provided to the moving element 900 that translates the movement of the sidecar element 910, via the linear gear 930, to circular motion of a shaft 940, that can be used for actuation. It will be understood that each sidecar element may be moved separately or may be moved together to produce the actuation depending on characteristics such as the desired speed of actuation, the size of actuation, and various other factors.

In operation, in the various embodiments, the sidecar is moved independently relative to the movement of the main body of the moving element, either external to or inside the main body, and the relative movement of the sidecar provides energy via an actuation mechanism to actuate a process or function related to the moving element, the linear motor conveyor system, an automation station, the automation system, or the like. In some examples, the actuation may involve the raising or lowering of pins, the movement of nests or parts on a pallet related to the moving element, the actuation of a stopper or the like on a related conveyor, the actuation of an automation station, provide a reciprocating pump, clamping, lifting, rotating, or any of various actuations that will be understood by one of skill in the art upon review of the present document.

It will be understood that the movement of the sidecar relative to the main body of the moving element can provide energy when moving in only one direction or when moving in both directions by appropriate arrangement of the actuation mechanism. Further, the movement of the sidecar relative to the main body can occur whether or not the main body or sidecar is already moving.

It will also be understood that other embodiments may have the "sidecar" placed in a different orientation vis-à-vis the moving element. The sidecar arrangement in the above embodiments is convenient in that a single linear motor can be used to move both the moving element and the sidecar. However, other arrangements could provide for the sidecar to have a separate linear motor to drive its movement, for example, if the sidecar was placed below, above or at some angle to the moving element. As long as there is relative movement between the sidecar and the moving element, actuation can occur.

Figure 10A:
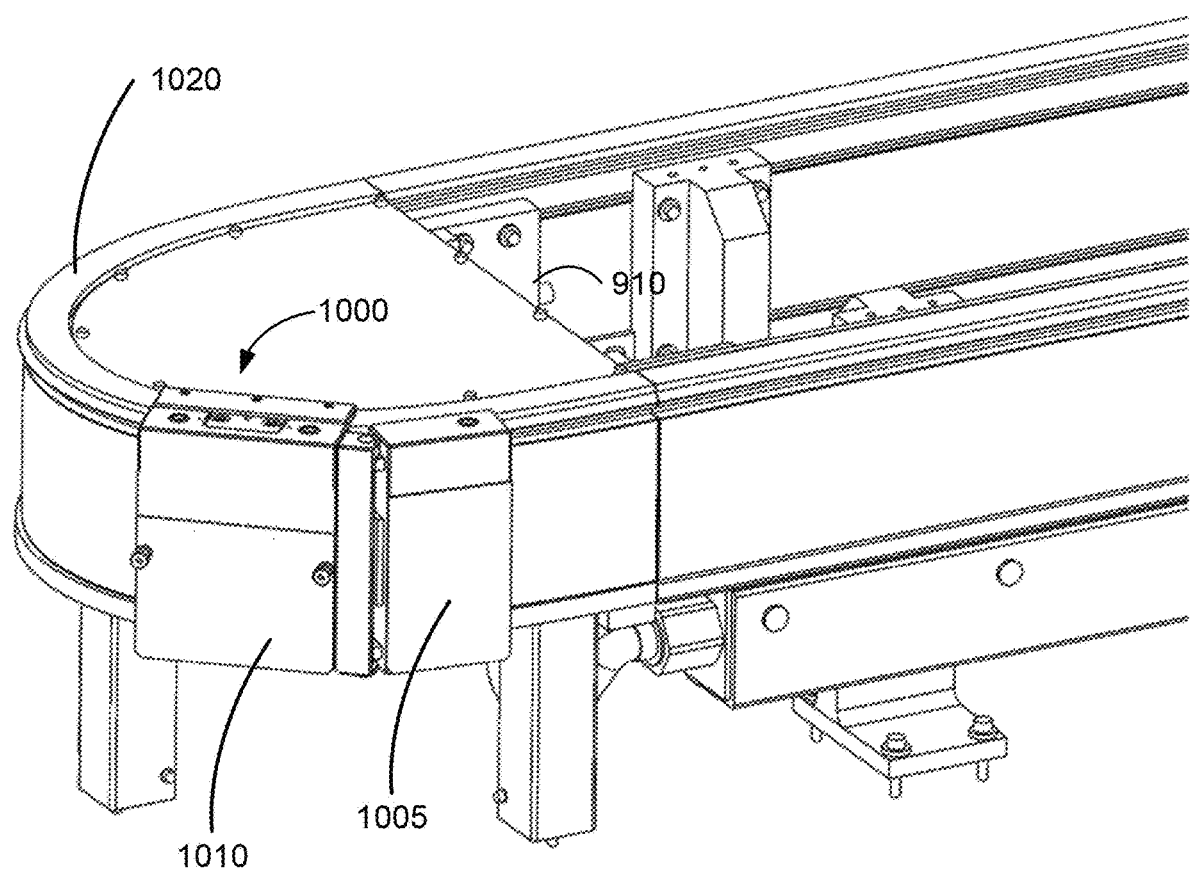
FIG. 10A is a perspective view of a track section with another embodiment of a moving element with sidecar in which the sidecar is hinged.
Figure 10B:
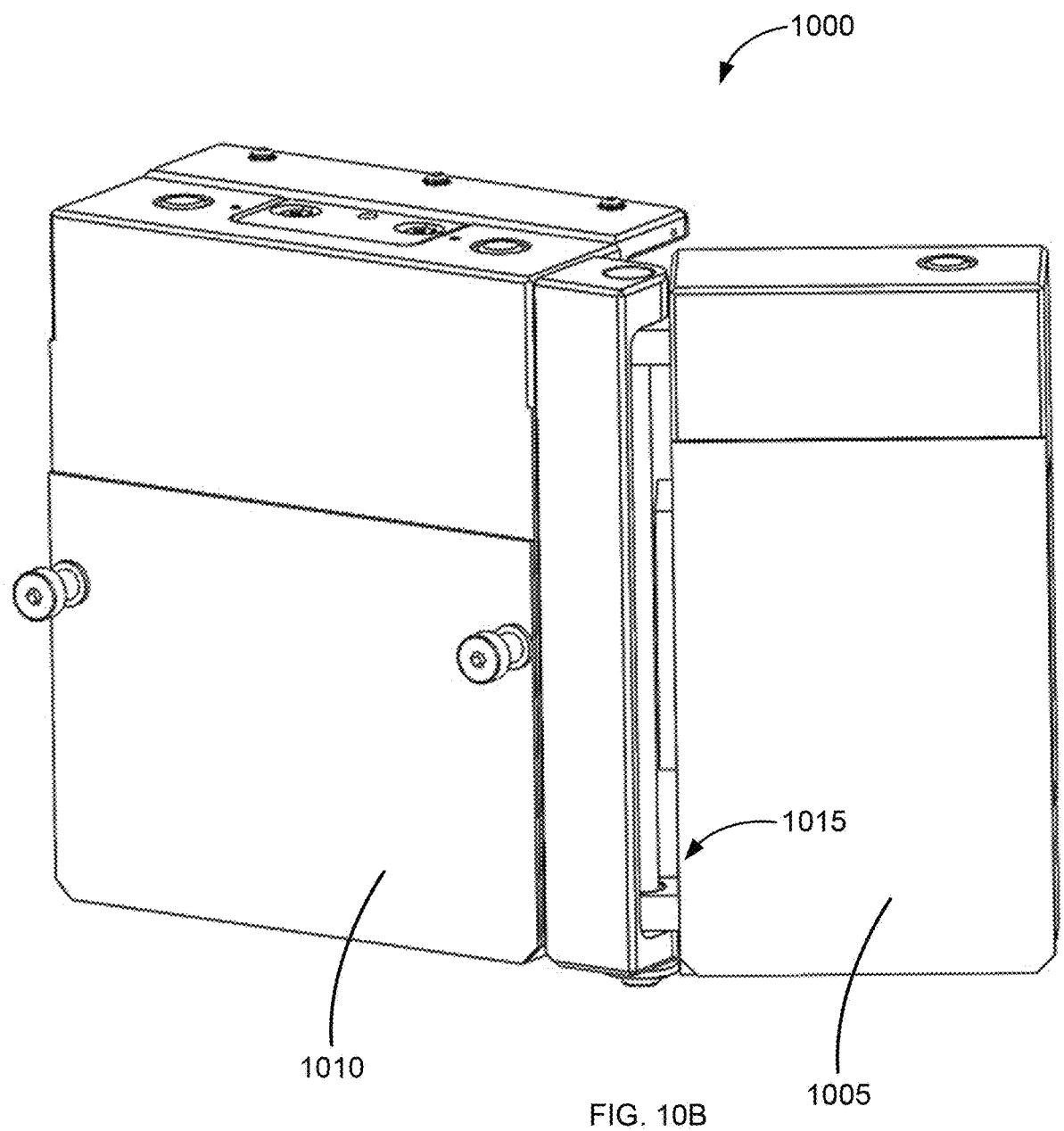
FIG. 10B is a front perspective view of the moving element with sidecar of FIG. 10A.
Figure 10C:
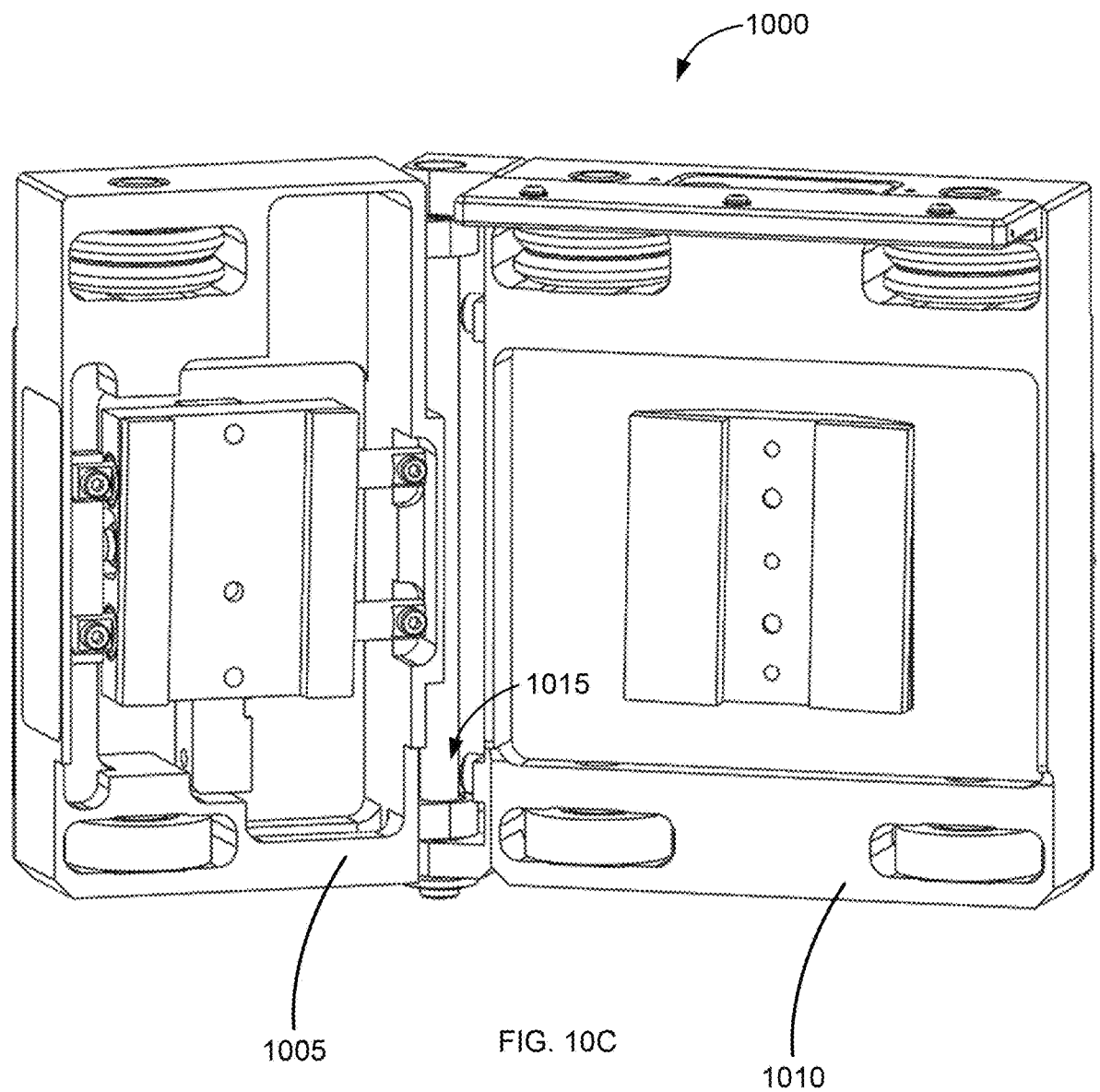
FIG. 10C is a rear perspective view of the moving element with sidecar of FIG. 10A.

In some cases, as illustrated in FIGS. 10A to 10C, in the above or other embodiments, a moving element 1000 may be provided with a sidecar portion 1005 connected with a main body 1010 of the moving element 1000 with a hinge-like connection 1015 to allow articulation when the moving element 1000 is moving on a curved track section 1020 or the like. Similarly, if a sidecar is not housed in a sidecar portion (such as in FIG. 7A), the sidecar may be connected in a hinge-like connection. FIG. 10A illustrates a moving element 1000 with hinged sidecar portion 1005 on a curved track section 1020. FIG. 10B is a perspective front view and FIG. 10C is a perspective rear view of an embodiment of a moving element 1000 with a hinge-like connection 1015 to the sidecar portion 1005.

Figure 11:
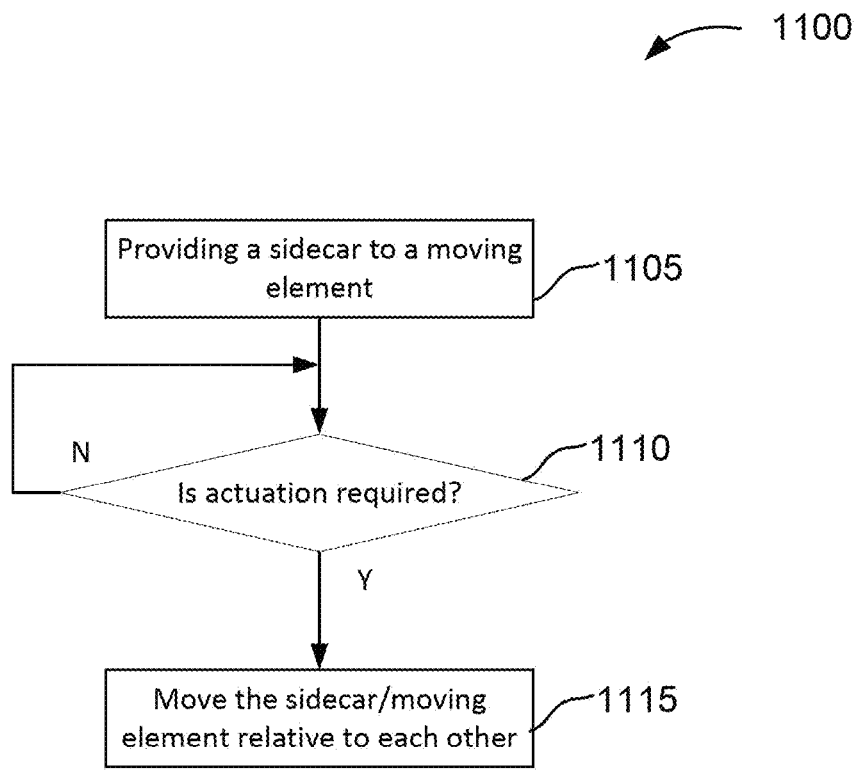
FIG. 11 is a flowchart illustrating a method of operating an automation system including a moving element with sidecar.

FIG. 11 illustrates a flowchart of an embodiment of a method 1100 of actuation on a linear motor conveyor. Initially, at 1105, a sidecar is provided to one or more moving elements on the linear motor conveyor. The linear motor conveyor is then operated and it is determined if actuation is needed at 1110. If so, at 1115, the sidecar or moving element or both are moved relative to each other in order to provide the energy for the actuation. As noted herein, in some cases, the relative movement may be stepwise to provide different steps in an actuation, the relative movement may be continuous, the relative movement may be in either direction and provide continuous energy/actuation or actuation/de-actuation depending on the direction, all depending on the type of actuation required.

In the preceding description, for purposes of explanation, numerous details are set forth in order to provide a thorough understanding of the embodiments. However, it will be apparent to one skilled in the art that these specific details may not be required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A linear motor conveyor system with actuation comprising:
    a track;
    a moving element configured to move on the track, the moving element comprising:
        a main body;
        a sidecar provided in a sidecar portion of the moving element; and
        an actuation mechanism provided to the moving element, the actuation mechanism comprising:
            an actuator; and
            a sidecar linkage connecting the sidecar to the actuator,
    wherein the main body and sidecar are each independently moveable on the track relative to the other.

2. A linear motor conveyor system according to claim 1, wherein the moving element comprises at least one bearing that is supported and travels on at least one rail provided on the track and the sidecar is supported by the moving element.

3. A linear motor conveyor system according to claim 1, wherein the moving element comprises at least one bearing that is supported by and travels on at least one rail provided on the track and the sidecar comprises at least one sidecar bearing that is also supported by and travels on the at least one rail.

4. A linear motor conveyor system according to claim 1, wherein the sidecar portion is connected with the main body in a configuration to facility movement around a curved track.

5. A linear motor conveyor system according to claim 1, wherein the moving element comprises one or more supports configured to support the sidecar in relation to the main body.

6. A linear motor conveyor system according to claim 1, wherein the actuation mechanism comprises one or more gears and actuation linkages.

7. A linear motor conveyor system according to claim 1, wherein the actuation mechanism comprises a generator and a servo motor.

8. A linear motor conveyor system according to claim 1, wherein the actuation mechanism is configured to actuate when relative movement between the sidecar and main body is in one direction and de-actuate when the relative movement is opposite to the direction for actuation.

9. A linear motor conveyor system according to claim 1, wherein the actuation mechanism is configured to provide multi-stage actuation based on a plurality of relative movements between the sidecar and main body.

10. A linear motor conveyor system according to claim 1, wherein the actuation mechanism is configured to provide actuation in proportion to the amount of relative movement between the sidecar and main body.

11. A method of actuation for a linear motor conveyor system having a track and at least one moving element, the method comprising:
   providing a sidecar as a part of the moving element and a sidecar linkage connecting the sidecar to a main body of the moving element; and
   independently moving the sidecar or the main body on the track relative to each other such that the sidecar linkage provides energy to an actuator provided to the moving element.

12. A method according to claim 11, wherein the independently moving provides energy to an actuator provided to the moving element whether the sidecar is moving relatively closer to or away from the main body.

13. A method according to claim 12, wherein the independently moving comprises a plurality of relative movements between the sidecar and the main body and the sidecar linkage provides energy to the actuator to provide multi-stage actuation based on the plurality of relative movements between the sidecar and the main body.

* * * * *